United States Patent
Barksdale, Jr.

(10) Patent No.: US 6,952,798 B2
(45) Date of Patent: Oct. 4, 2005

(54) METHOD FOR DETERMINING THE PERFORMANCE OF A COMMUNICATIONS SYSTEM

(76) Inventor: William W. Barksdale, Jr., 140 Shoals Creek Rd., Covington, GA (US) 30016

(*) Notice: Subject to any disclaimer, the term of this patent is extended or adjusted under 35 U.S.C. 154(b) by 1043 days.

(21) Appl. No.: 09/811,219

(22) Filed: Mar. 17, 2001

(65) Prior Publication Data
US 2003/0194001 A1 Oct. 16, 2003

Related U.S. Application Data

(60) Provisional application No. 60/193,102, filed on Mar. 30, 2000.

(51) Int. Cl.$^7$ ............................................. H03K 5/159
(52) U.S. Cl. ...................................................... 715/224
(58) Field of Search ......................... 375/224; 455/423, 455/424, 425; 702/85, 107, 117, 118, 112

(56) References Cited

U.S. PATENT DOCUMENTS

| | | | | |
|---|---|---|---|---|
| 5,768,500 A | * | 6/1998 | Agrawal et al. | 395/184.01 |
| 6,751,343 B1 | * | 6/2004 | Ferrell et al. | 382/145 |
| 2001/0041139 A1 | * | 11/2001 | Sabini et al. | 417/18 |
| 2003/0055679 A1 | * | 3/2003 | Soll et al. | 705/2 |

* cited by examiner

Primary Examiner—Mohammed Ghayour
Assistant Examiner—Dun X. Nguyen
(74) Attorney, Agent, or Firm—Technoprop Colton LLC

(57) ABSTRACT

A method for determining the performance of a telecommunications system by first benchmarking the system performance, while locating any defective RF equipment at each channel and site tested, second taking specific information for the specified location or locations, then adding exact distances between the reference site and test point coordinates, and third measuring and recording the required data and comparing the data to determine which component or components, if any, are not performing up to acceptable levels.

13 Claims, 17 Drawing Sheets

METHOD FOR DETERMINING THE PERFORMANCE OF A COMMUNICATIONS SYSTEM

This application claims the benefit of Provisional application Ser. No. 60/193,102, filed Mar. 30, 2000.

BACKGROUND OF THE INVENTION

1. Technical Field

The present invention relates generally to methods for determining the performance of communications systems and more specifically to methods for benchmarking analog and digital radio frequency systems and then determining whether the systems are performing at an acceptable level.

2. Prior Art

The typical communications system comprises radio frequency transmitting and receiving devices. A simple example of such a system is an amplitude modulation, or AM, radio station. The two primary components of such an AM radio station are the station itself, which comprises components for transmitting a radio frequency signal, and a receiver, such as a common portable radio, which comprises components for receiving a radio frequency and converting the frequency to sound waves capable of being heard by the user. This type of system typically operates on one channel or frequency per station.

A more complex example of a telecommunications system is a combined transmitting and receiving communications system such as that used by public safety departments. This type of system generally allows both transmitting and receiving at both ends of the system by using both a transmitter and receiver at the station, such as the dispatch station, and at the user, such as the patrol car. Often the devices will combine transmitting and receiving functions. In effect, both the dispatch station and the patrol car are discrete radio stations capable of transmitting and receiving radio frequency signals. This type of system typically operates on multiple channels or frequencies, and can operate on the AM mode, or on other modes, such as for example frequency modulation (FM) or wide frequency modulation (WFM), using for example high frequency (HF), very high frequency (VHF) or ultra high frequency (UHF) signals.

Currently, a primary method used for determining whether a component within a telecommunications system is not performing up to acceptable standards is trial and error by removing and replacing individual components such as cables, connectors, antennas, filters and electronic hardware one at a time to determine which component is performing below standards. This is costly in, first, the time it takes to remove and replace each component until the faulty component is found, and, second, the need to have replacement components for each component of the telecommunications system. This also often involves potentially dangerous tower climbs of the suspect antenna. An even more costly way of increasing the performance level of a telecommunications system is to add additional transmitting/receiving sites or arrays without determining whether the existing transmitting/receiving sites are performing at acceptable levels.

Thus, it can be seen that a method for determining the performance of a telecommunications system that does not involve the component-by-component removal and replacement or the wholesale addition of an additional transmitting/receiving site is desirable.

BRIEF SUMMARY OF THE INVENTION

The reason this process is needed is simple. At the present time, there is no easy way to accurately determine if something has gone wrong with the transmission lines or antennas on a communications system. The system antennas (transmit or receive) could be significantly damaged by water, lightning, age deterioration, or vandalism, yet no alarms would be generated to call attention to the problem. Until now, there simply has been no process that can remotely determine if a transmission line or antenna is defective. Total radio frequency (RF) performance testing and evaluation is the answer to this type of problem.

The total RF performance evaluation process of the present invention can be applied to both analog and digital systems, and comprises several steps. The first step is to benchmark the system performance, while locating any defective RF equipment at each channel and site tested. Benchmarking an RF system is defined as making accurate RF power measurements (arid receiver sensitivity measurements) at specified locations, which is designed to verify that all the RF transmitters and receivers are meeting specifications.

The second step is to take specific information for the specified location or locations, then add exact distances between the reference site and test point coordinates, typically via a global positioning system (GPS) receiver. This step also calculates angular direction (bearing) based upon the coordinates. In addition, this step utilizes fixed end and remote end antenna gains, as well as fixed end beam width and down tilt. The results obtained are quite impressive in terms of accuracy.

The third step is to measure and record the required data. There are numerous rules that must be followed to obtain accurate and satisfactory results.

In field tests and actual system troubleshooting projects, this process has proven to be very accurate and reliable. If fact, it is easily accurate enough to identify a problem in virtually any transmit or receive system without having to make tower climbs simply to establish that something is wrong. This process has very significant cost saving potential and decreases the possible dangerous aspects of current methods, as well as the possibility of producing significant revenue.

Therefore, it is an object of the present invention to provide a method for determining the performance of a communications system and the individual components therefore.

It is another object of the present invention to provide a method for determining the performance of a communications system that allows the user to benchmark the entire system for use in later performance evaluations.

It is another object of the present invention to provide a method for determining the performance of a communications system that eliminates or reduces the need for a component-by-component check each time the performance of the system is evaluated.

It is another object of the present invention to provide a method for determining the performance of a communications system that reduces the need for adding additional transmitting/receiving sites to the system to increase the performance of the system, or to bring the performance of the system up to acceptable standards.

It is another object of the present invention to provide a method for determining the performance of a communications system that reduces the time needed to evaluate a telecommunications system.

It is another object of the present invention to provide a method for determining the performance of a communications system that reduces the cost of evaluating a telecommunications system.

It is another object of the present invention to provide a method for determining the performance of a communications system that is simple to carry out, produces repeatable results, and increases the overall efficiency of the performance evaluation process.

These objects, and other object, features and advantages of the present method, will become more apparent to those of ordinary skill in the art when the following detailed description of the preferred embodiments is read in conjunction with the appended figures, in which like reference numerals represent like components throughout the various figures.

BRIEF DESCRIPTION OF THE FIGURES

FIG. 4 is a representative RF Doc spreadsheet for inputting the values for carrying out the present invention.

FIG. 5 is a representative Talk In-Out spreadsheet showing the radio frequency site evaluation documentation when the method of the present invention is carried out.

DETAILED DESCRIPTION OF THE PREFERRED EMBODIMENTS

The present method provides an easy and accurate way to determine if something has gone wrong with the transmission lines or antennas on a communications system. The transmitting or receiving antennas of the system, or other components such as cables, connectors, filters and hardware components, could be damaged by water, lightning, age deterioration, or vandalism, yet no alarms would be generated to call attention to the problem. The total radio frequency (RF) performance testing and evaluation method of the present invention solves this type of problem.

1. General.

The total RF performance evaluation process of the present invention can be applied to both analog and digital systems, and comprises several steps. The first step is to benchmark the system performance, while locating any defective RF equipment at each channel and site tested. The second step is to take specific information for the specified location or locations, then add exact distances between the reference site and test point coordinates. The third step is to measure and record the required data and comparing the data to determine which component or components, if any, are not performing up to acceptable levels.

Figure 1:
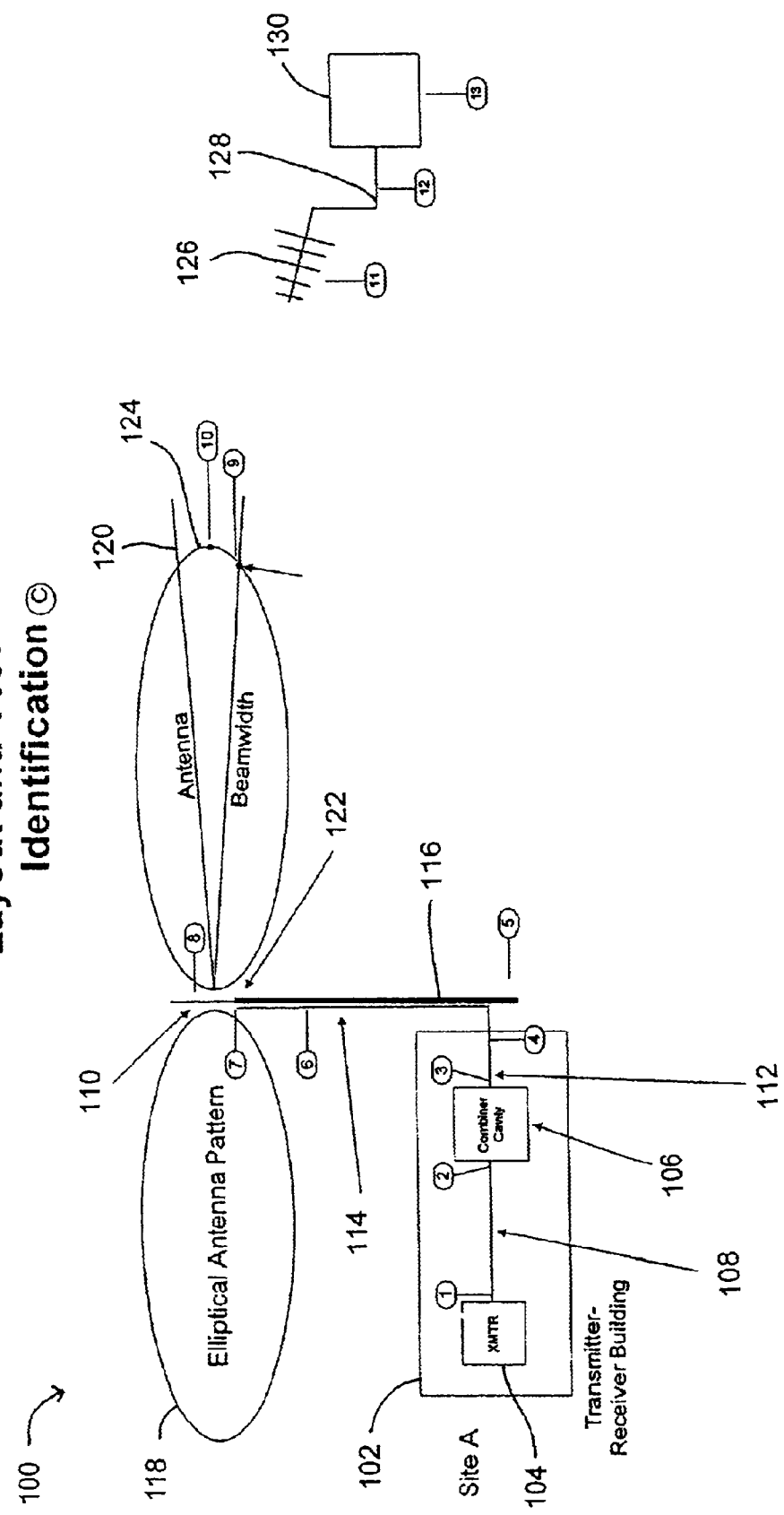
FIG. 1 is a schematic of basic radio frequency system layout and test point identification whose performance can be evaluated by the present invention.

The total RF performance process of the present invention works by first making accurate and methodical measurements of each transmitter and receiver, of every channel, at each site, in a particular RF system. Referring to FIG. 1, which represents a basic RF system layout capable of being evaluated by the present method, the various test points that are used as data points are shown. This is the benchmarking process in which the RF system is defined as making accurate RF power measurements (and receiver sensitivity measurements) at specified locations, and is designed to verify that all the RF transmitters and receivers are meeting specifications.

Figure 2:
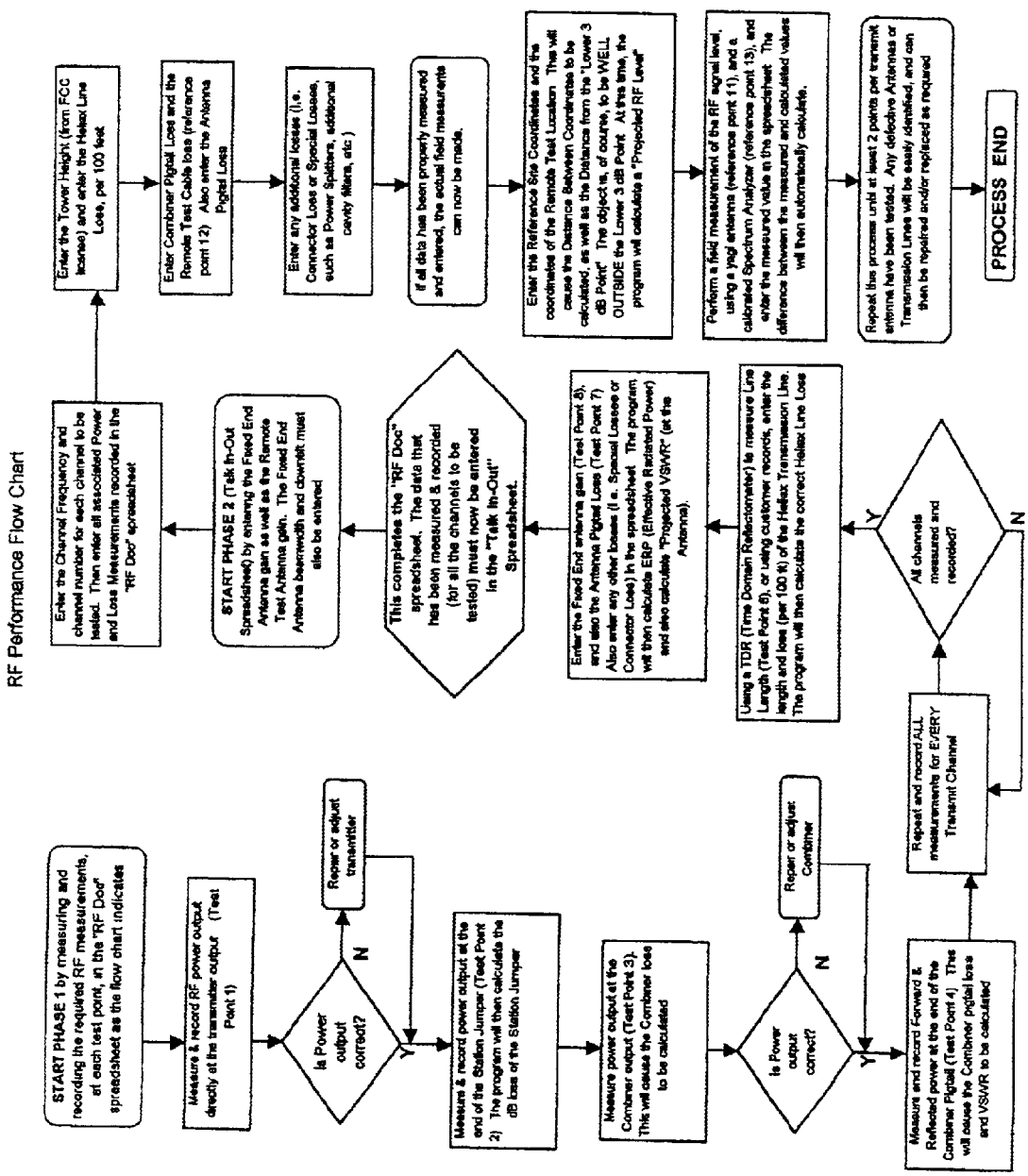
FIG. 2 is a flow chart for the method of the present invention.

This benchmarking process is continued until all RF sites within a particular system have been tested. The process of making these measurements causes the loss of every cable and every RF device, in the RF signal path, to be automatically calculated. These losses, when referenced to the transmitter output power level, the gain of the fixed end and remote end antenna, and the exact distance between the reference site and test site, causes accurate RF signal level calculations to be automatically generated. The beam width and down tilt of the fixed end antennas are also used to accurately interpret the spreadsheet calculations. Referring to FIG. 2, which is a flow chart of the present process, the various steps for carrying out the process are shown and described in more detail.

Figure 4:
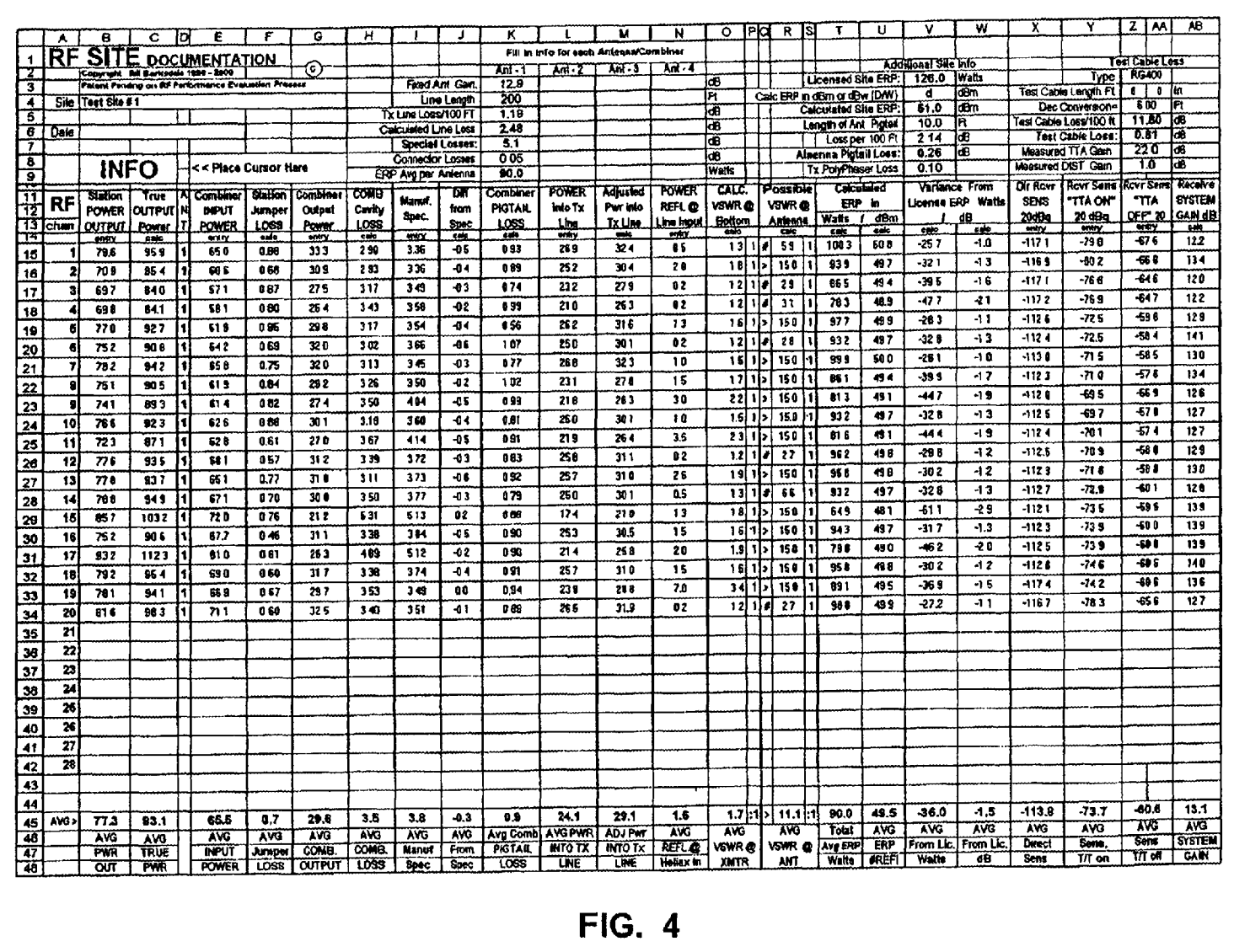
Figure 5:
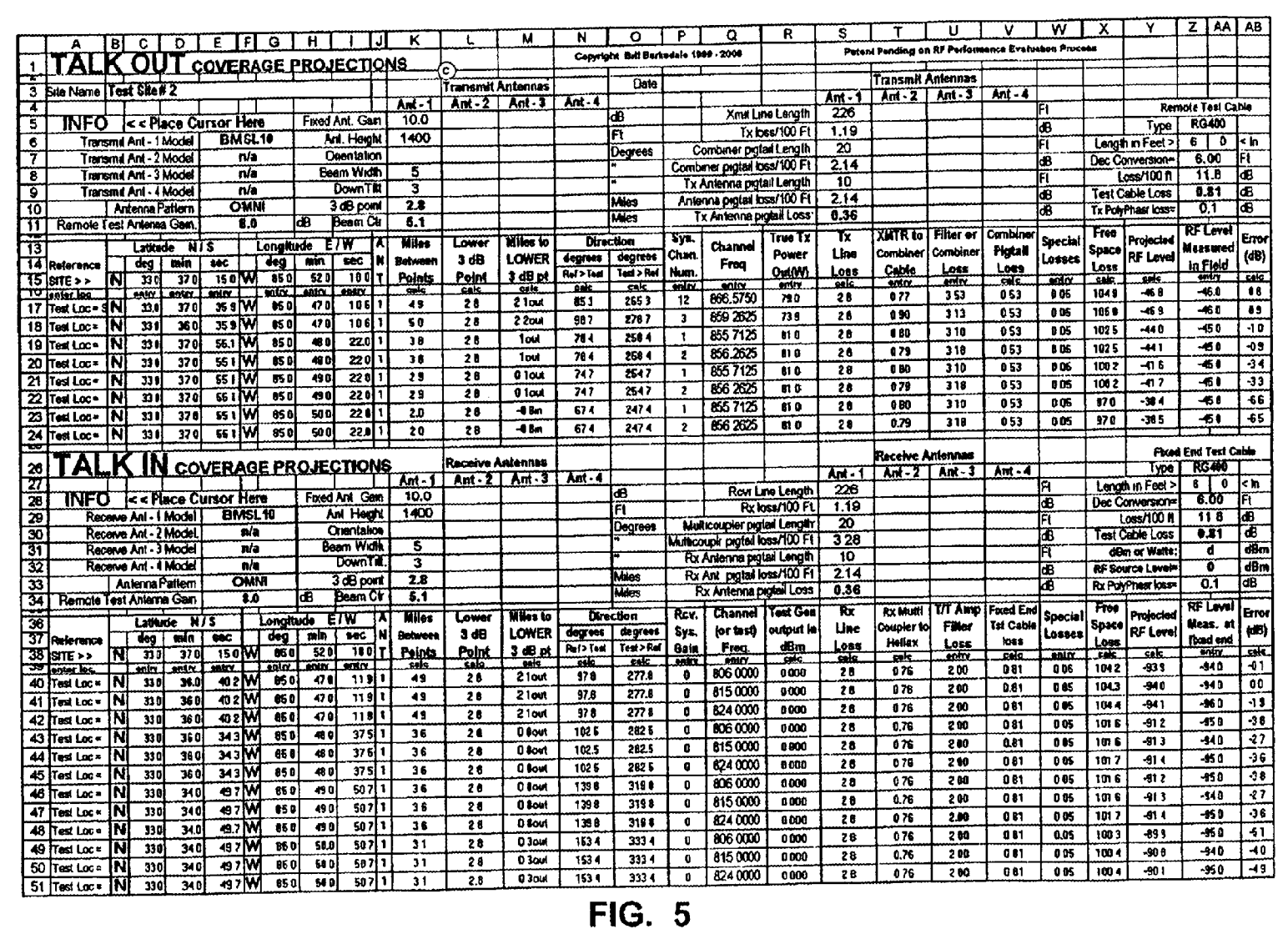

There are two spreadsheets for this process on which data is entered and calculated. The first spreadsheet is the RF Doc spreadsheet. This spreadsheet is where all the transmitter power levels, as well as receiver sensitivities, transmission line losses, etc., are entered. A representative RF Doc spreadsheet is shown in FIG. 4. The second spreadsheet is the Talk In-Out spreadsheet. This spreadsheet utilizes the data gathered from the RF Doc spreadsheet in combination with exact distance calculations, typically done via a global positioning system (GPS) receiver, antenna beam width, antenna down tilt, all cable losses, all antenna gains, as well as any special system losses. A representative Talk In-Out spreadsheet is shown in FIG. 5. If all measurements have been accurately made, and all other parameters have been correctly entered, the spreadsheet calculations result in a very accurate snapshot of how the RF portion of the system is working. This step also calculates angular direction (bearing) based upon the coordinates. The results obtained are quite impressive in terms of accuracy.

The calculations are then compared to actual field measurements to totally verify system performance. This last step is what completes the process loop and is actually what provides the final proof of RF system performance.

Figure 3:
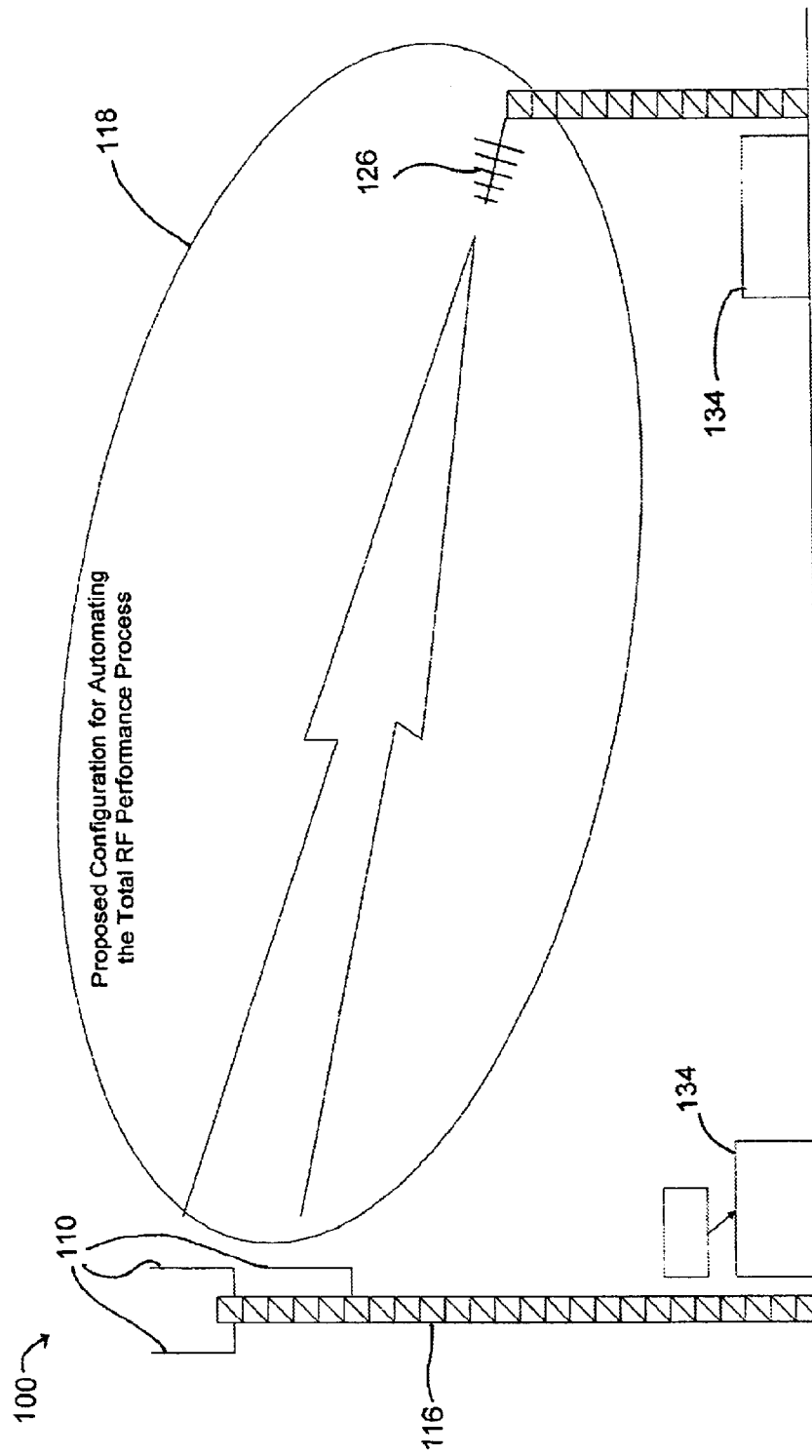
FIG. 3 is a representation of the proposed configuration for automating the total radio frequency performance process of the present invention.

As stated previously, the total RF performance process could be automated by taking the base line data that the process generates, and then programming this information into data stations. These data stations would then perform Talk In and Talk Out testing and monitoring on an automatic and continuous basis. Alarms would be generated and reported if the RF performance tests fall outside the programmed nominal values. FIG. 3 illustrates a proposed configuration for automating the total RF performance process of the present invention. Once the required data has been gathered, using the software tools previously mentioned, the information could be entered into a programmable data station. This data station could then constantly monitor every channel of a single site in a multi site RF system. Typically one programmable data station would be required to monitor each individual RF site. This station would not be located at the site, but rather a short (and calculated) distance away. Naturally, each station would have to report to another data station at each RF site. If the data station sees the RF signal level fall below a predetermined window, it could report a real time alarm to the service provider or alarm monitoring facility. The data station(s) could also be set up so that the RF tests can be done on system Talk In and Talk Out. This approach would constantly monitor both the transmit and receive performance of the system. This process would provide definite proof of proper system performance and can be used to identify problems and track the system's performance throughout its life. Existing RF equipment that can be adapted for this purpose, or can be developed to perform this specific task.

The workbook comprising all of the information for carrying out the process of the present invention is attached to and made a part of this specification as Appendix 1. The workbook contains the definitions and formulas necessary for the present invention, as well as worksheets and instructions for entering the appropriate data. The workbook also contains representative spreadsheets of entered data and example evaluations of an RF system carried out by the present invention. The workbook further contains data for RF systems, such as local oscillator radiation, receiver image and crystal responses, transmission line and connector losses, mobile antenna gains, RF frequency assignments, attenuation of antennas and the like.

2. Basic RF System Layout And Test Point Identification.

Referring now to FIG. 1, a basic RF system layout 100 is shown, along with the test points for the present invention. A basic RF system comprises a transmitter-receiver building 102 containing a transmitter 104 and a combiner cavity 106 connected by a station jumper 108. The combiner cavity 106 is connected to a transmitting antenna 110 by a combiner pigtail 112 and a transmission line 114. The antenna 110 typically is located at the top of an antenna tower 116, with the transmission line 114 running down the antenna tower 116 from the antenna 110 to the combiner pigtail 112.

An antenna 110 simply is a conductor or group of conductors used for radiating RF energy into space or collecting radiated RF energy from space. The transmission line 114 conducts RF energy between the transmitter 104 or receiver (not shown) and the antenna 110. The distances between the antenna 110 and the transmitter 104 or receiver can vary. It is preferable to have the transmitter 104 and receiver as close as possible to the antenna 110 to minimize losses in the transmission line 114.

Transmitting antennas 110 typically have an elliptical radiation pattern 118, which is generally torroidal in shape with the antenna 110 located in the center (as the axis) of the torroid. Antennas 110 can be configured such that the radiation pattern 118 is horizontal, as shown in FIG. 1, tilted downward, as shown in FIG. 3, or many other geometries. The antenna beamwidth 120 is a section of the radiation pattern 118 where the transmissions are the strongest, and typically is the wedge-shaped section of the radiation pattern located between the lower 3 db power point and the upper 3 db power point of the radiation pattern 118 when the antenna is operating at half power.

Various power test points are identified on FIG. 1. As disclosed in more detail below, the power measured at these test points is used in the invention to benchmark the RF system 100 for later determination of the RF system performance. Test point 1 is the power output directly at the transmitter 104 output. Test point 2 is the power output at the end of the station jumper 108. Test point 3 is the power output at the combiner cavity 106 output. Test point 4 is the end of the combiner pigtail 112 (generally located at the outside wall of the transmitter-receiver building 102). Test point 5 is a repetition of Test points 1–4 for every transmit channel of the RF system 100. Test point 6 is the transmission line 114 length. Test point 7 is the antenna pigtail 122 loss. Test point 8 is the antenna 110 gain. Test point 9 is the lower 3 db power point of the elliptical radiation pattern 118 with the antenna 110 operating at half power and represents the antenna beamwidth 120. Test point 10 is the beam center 124 of the antenna beamwidth 120 and represents the antenna beam downtilt. Test point 11 is the remote test antenna 126. Test point 12 is the remote test cable 128 loss. Test point 13 is the spectrum analyzer 130, and generally the distance between the antenna 110 and the spectrum analyzer 130.

FIG. 1 is a representation of a single transmit channel at a single RF site. There may be up to 28 or more transmit and receive channels at each RF site and numerous RF sites within a complete radio system. Additionally, FIG. 1 only represents the transmit portion of the radio system. Many radio systems also have receive capabilities that are not shown in FIG. 1 to simplify the drawing. Typically, any measurement that can be made on transmit also can be made on receive. The present invention is designed to measure both transmit and receive performance.

3. Benchmarking The RF System.

The first step in the process is to benchmark the RF system. Preferably, a first benchmarking step (initialization) occurs immediately after the RF system is installed, when all system components are new and presumably operate according to manufacturer specifications. Then, when the system is benchmarked later and compared to the first or any previous benchmarking, it can be more easily determined whether any and which system components have deteriorated or are not performing up to specifications. However, already existing and operating systems also can be benchmarked (also referred to as initialization) and later benchmarkings can be compared to the initialization benchmarking. FIG. 2 provides a flow chart of the benchmarking step.

Referring now to FIG. 1, the preferred benchmarking proceeds sequentially starting at Test point 1. However, benchmarking can occur in any order and various Test points can be omitted if it is known or assumed that a certain or certain system components are not operating properly or up to specifications. Phase 1 of the benchmarking step comprises measuring and recording the required RF measurements at each Test point. Phase 2 of the benchmarking step comprises entering the measured and recorded data into the appropriate spreadsheet, measuring and/or entering entering certain additional data regarding the RF system and the remote test set-up into the appropriate spreadsheet, and conducting the field tests.

Phase 1 starts with measuring and recording the required RF measurements at each Test point in the RF Doc spreadsheet shown in FIG. 4 as follows:

Test point 1: measure and record the RF power output directly at the transmitter 104 output. Each transmitter 104 has a rated power output. However, a given transmitter 104 may not actually reach the rated power output. The actual power output of the transmitter 104 is measured and recorded in the RF Doc spreadsheet. If the power output of the transmitter 104 is not correct, the transmitter 104 should be repaired, adjusted or replaced.

Test point 2: Measure and record the power output at the end of the station jumper 108. Using known equations, by comparing the power output at the end of the station jumper 108 and the power output at the transmitter 104 output, one can calculate the db loss of the station jumper 108. If the db loss of the station jumper 108 is too high, or not within specifications, the station jumper 108 should be repaired, adjusted or replaced.

Test point 3: Measure and record the power output at the combiner 106. Using know equations, by comparing the power output at the combiner 106 output and the power output at the end of the station jumper 108, one can calculate the power loss of the combiner 106. If the power loss of the combiner 106 is not correct, or not within specifications, the combiner 106 should be repaired, adjusted or replaced.

Test point 4: measure and record the forward and reflected power at the end of the combiner pigtail 112. Using known equations, by comparing the power output at the end of the combiner pigtail 112 and the power output at the combiner 106 output, one can calculate the db loss and the VSWR of the combiner pigtail 112. If the db loss and/or the VSWR of the combiner pigtail 112 is too high, or not within specifications, the combiner pigtail 112 should be repaired, adjusted or replaced.

Test point 5: repeat Test points 1–4 for each and every channel of the RF system 100, and measure and record the power outputs on the RF Doc spreadsheet.

Test point 6: using a time domain reflectometer (TDR) or the equivalent, measure the length of the transmission line 114. Using known equations, the db loss of the transmission line 114 can be calculated as a function of the type and length of the transmission line 114. Alternatively, if the type, length and loss of the transmission line 114 is known, these values can be entered onto the RF Doc spreadsheet directly.

Test point 7: Each antenna pigtail 122 has a rated loss. This loss is entered onto the RF Doc spreadsheet.

Test point 8: Each antenna 110 has a rated gain. This gain is entered onto the RF Doc spreadsheet.

Any other known losses also are entered onto the RF Doc spreadsheet. For example, there may be special losses associated with a particular RF system 100 and/or there may be known losses resulting from the various connectors or other minor components of the RF system 100.

After all of the information obtained at Test points 1–8 and the various special losses and/or connector losses are entered onto the RF Doc spreadsheet, the effective radiated power (ERP) and the projected VSWR at the antenna are calculated by the RF Doc spreadsheet using known embedded equations.

Phase 2 starts with entering the data gathered in Phase 1 for all channels to be tested onto the Talk In-Out spreadsheet shown in FIG. 5. The fixed end antenna 110 gain and the remote test antenna 126 gain are entered onto the Talk In-Out spreadsheet, along with the fixed end antenna 110 beamwidth 120 and downtilt.

Referring now to FIGS. 1 and 3, antennas have a measurable and known radiation pattern 118, represented by an ellipse. The actual geometry of the radiation pattern 118 is a torroid having an elliptical cross-section. Only the cross-section is shown in the FIGS. Furthers, antennas can be configured to radiate the RF at a specific angle, which is referred to as the downtilt. FIG. 1 shows a horizontal downtilt (which is no downtilt), and FIG. 3 shows a downtilt towards the ground. The ellipses shown in FIGS. 1 and 3 are approximations of the antenna 110 radiation pattern 118 from a typical fixed end antenna site. The process disclosed in this specification can handle antennas 132 of any type and radiation pattern 118. Antennas 132 also have a beamwidth 120, which is the portion of the RF beam between the lower 3 db and the upper 3 db of the radiation pattern 118.

Test point 9: enter the antenna beamwidth 120 onto the Talk In-Out spreadsheet.

Test point 10: enter the antenna downtilt onto the Talk In-Out spreadsheet.

At this stage, the channel frequency and the channel number for each channel to be tested are entered onto the Talk In-Out spreadsheet. Next, all associated power and loss measurements from Phase 1 are entered onto the Talk In-Out spreadsheet. The measurements from Phase 1 can be entered onto the Talk In-Out spreadsheet automatically by the spreadsheet program, and need not be re-entered manually by the user, if this capability is present. The antenna tower 116 height and the transmission line 114 loss (per 100 feet) are entered onto the Talk In-Out spreadsheet. The spreadsheet has an embedded known equation to determine the transmission line 114 loss based on the length and type of cable used for the transmission line 114. The combiner pigtail 112 loss,d the remote test cable 128 (also Test point 12) loss, and the antenna pigtail 122 loss are entered onto the Talk In-Out spreadsheet. Finally, all additional losses, such as the special losses or connector losses discussed before, are entered onto the Talk In-Out spreadsheet.

Phase 3 involves the actual field measurements and is used to determine defective or improperly performing antennas 132 and/or transmission lines 114. A remote test location is selected from which the measurements are to be taken. The remote test location should be within the line of sight of the antenna 110, but outside the lower 3 db point of the radiation pattern 118. The distance between the antenna 110 and the remote test location is recorded. Although this can be determined by using a map and entering the measured distance, the more exact the measurement, the more exact the process will be. Thus, it is preferred to enter the actual coordinates of the antenna 110 and the remote test location onto the Talk In-Out spreadsheet. A commercial global positioning system (GPS) receiver can be used to obtain the coordinates of the antenna 110 and the remote test location. The Talk In-Out spreadsheet also will calculate the distance between the reference site and the test point or test points, if more than one test point is used, will calculate the distance from the lower 3 db point to the remote test location, and can calculate the distance from the fixed antenna to the lower 3 db point and between multiple test points.

Test point 11: perform a field measurement of the RF signal level using a remote test antenna 126, preferably a yagi antenna. The remote test antenna 126 is connected to a spectrum analyzer 130 via a remote test cable 128.

Test point 12: measure the remote test cable loss for entry onto the Talk In-Out spreadsheet as discussed before.

Test point 13: use a calibrated spectrum analyzer 130 to obtain the RF signal measurement from the RF system 100, and enter the measured value onto the Talk In-Out spreadsheet. The Talk In-Out spreadsheet, using an embedded known equation, will calculate the difference between the measured and calculated values for the RF signal. This process should be repeated until at least two points per transmit antenna have been tested. Any defective antennas 132 or transmission lines can be easily identified and repaired, adjusted or replaced as necessary.

The field measurements can be taken at any selected remote test location satisfying the disclosed characteristics. Subsequent field measurements can be taken at a different remote test location, as long as the proper remote test location coordinates are entered onto the Talk In-Out spreadsheet. Using different remote test locations for subsequent benchmarkings may help determine whether an antenna 110 is performing properly and emitting a proper radiation pattern 118.

The RF Doc spreadsheet and the Talk In-Out spreadsheet have the known equations for determining the loss of each component embedded within the spreadsheet, as well as the other known equations for determining the performance of the RF system 100. Thus, after the measured values are recorded in the RF Doc spreadsheet and the Talk In-Out spreadsheet, the losses and other values are calculated automatically by the RF Doc spreadsheet and the Talk In-Out spreadsheet.

4. Determining Non-Performing Components and Repeating the Benchmarking Process.

At each Test point, specific measurements of specific components of the RF system 100 are taken. These measurements are compared to published, known or desired values (specifications) for these specific components. If the measured values are different from the specifications, it is now known that the specific component is not performing properly, and steps can be taken to repair, adjust or replace the specific component.

Using the measured and calculated results as a whole, it also can be determined whether the RF system 100 is performing at peak performance, or within acceptable performance limits. If the RF system 100 is performing within acceptable performance limits, even though one or more of the specific components of the RF system 100 may not be performing within the specifications, it may not be necessary to repair, adjust or replace the specific components not performing within the specifications. Likewise, if the RF system 100 begins to perform outside of the acceptable performance limits, it may be necessary to repair, adjust or replace only one or two specific components not performing within specification to bring the overall performance of the RF system 100 within the acceptable limitations, thus saving cost over repairing, adjusting or replacing all non-performing components or the entire RF system 100.

The RF system 100 also can be benchmarked one or more times after the first benchmarking to determine the performance of the RF system 100 over time. This will help determine the life cycle of specific components and the entire RF system.

5. Automating the Process.

FIG. 3 illustrates a configuration for automating the total RF performance process. One method of automating the process is to use programmable data stations 134, one located at the reference site and one located at the remote test location, which is now preferably a permanent remote test location.

The programmable data station 134 located at the reference site (the RF system 100 location) monitors the Test points located at the RF system 100 location and updates the RF Doc spreadsheet and the Talk In-Out spreadsheet as necessary. The parameters for each Test point then are stored as base data. The programmable data station 134 located at the reference site also should be capable of receiving data from the programmable data station 134 located at the remote test location.

The programmable data station 134 located at the remote test location monitors the Test points located in the field and transmits this data to the remote data station 134 located at the reference site. Such transmissions can be a separate RF signal sent through the air or by cable, or can be downloaded onto memory device and physically taken to the remote data station 134 located at the reference site.

The remote data stations 134 can be programmed to check each RF channel on the RF system 100, on all transmit and receive frequencies. This allows the RF system to be continuously monitored. The actual RF level and the projected RF level then can be continuously compared, or compared at predetermined intervals. The field or remote Test point values can be transmitted to the reference site for comparison to benchmark values and/or unit values. If the actual RF level changes, or differs from the projected RF level, by more than a predetermined amount, this could signify one or more faulty fixed antennas, and an alarm is triggered, and the appropriate remedial action can be undertaken. Further, when the performance of specific components of the RF system 100, or the RF system 100 as a whole, fall outside of the specifications, alarms can be triggered, and the appropriate remedial action can be undertaken.

6. Example Benchmarking.

Referring now to FIGS. 4–17, an example benchmarking process is shown. The data is taken from the benchmarking of actual RF systems 100 and are representative of how the present process operates. The representative RF system 100 in FIG. 4 has one antenna 110 and 20 channels, and the representative RF system 100 in FIG. 5 has one antenna 110.

In FIG. 4, the antenna 110 information is entered at the top of the RF Doc spreadsheet (entitled RF SITE DOCUMENTATION), namely the fixed antenna gain, transmission line length, transmission line loss pre 100 feet, special losses and connector losses. Using embedded known equations, the calculated line loss and the ERP average per antenna are calculated. The site information also is entered at the top of the RF Doc spreadsheet, namely the licensed site ERP, the units desired for the ERP calculations (dbm or dbw), the measured AC voltage and the specified AC voltage. Using embedded known equations, the calculated site ERP, the percent AC volt error and the transmission polyphaser loss are calculated. The test cable information also is entered at the top of the RF Doc spreadsheet, namely the type of cable, the test cable length, and the test cable loss per 100 feet. Using embedded known equations, the test cable loss, the measured TTA gain and the measured DIST. Gain are calculated.

The Test point and other base data are entered in the main body of the RF Doc spreadsheet. For each RF channel, the measured Test point data is entered: station power receiver 104 output (Test point 1), combiner 106 input power at the end of the station jumper 108 (Test point 2), combiner 106 output power (Test point 3), manufacturer's specified combiner 106 output power, power into the transmission line 114 (Test point 4), the power reflected at the transmission line 114 input (Test point 6), the Dir Rcvr SENS 20 dbq, the Rcvr Sens "TTA ON"0 20 dbq, and the Rcvr Sens "TTA OFF" 20. Using embedded known equations, the RF Doc spreadsheet calculates the true output power of the transmitter 104, the station jumper 108 loss, the combiner cavity 106 loss, the difference between the actual combiner cavity 106 loss and the manufacturer's specifications for loss, the combiner pigtail 112 loss, the adjusted power into the transmission line 114, the calculated VSWR at the bottom, the possible VSWR at the antenna 110, the calculated ERP in Wafts and dbm, the variance of the calculated ERP from the licensed ERP in Wafts and db, and the receive system gain. Averages for all of the entered and calculated values are given across the bottom of the RF Doc spreadsheet.

In FIG. 5, the basic information about the antenna 110 and the remote test cable 128 are entered onto the Talk In-Out spreadsheet in much the same manner as entered for the RF Doc spreadsheet. As can be seen, information about both transmitting antennas and receiving antennas is entered. The coordinates of the reference site are entered, as well as the coordinates for each remote test location.

The RF system 100 channel number, channel frequency, direct transmission power out, transmitter 104 to combiner 106 cable (station jumper 108) loss, combiner 106 loss, special losses and RF level measured in the field are entered in the Talk Out portion of the Talk In-Out spreadsheet. Using embedded known equations, the distance between the reference site and the remote test location are calculated, along with the lower 3 db point, the distance to the lower 3 db point, the distance between the lower 3 db point and the remote test location, the direction from the reference site to the remote test location, the transmission line 114 loss, the combiner pigtail 112 loss, the free space loss, the projected RF level, and the error.

The receiver system gain, the channel or test frequency, the T/T amplifier filter loss, special losses, and the RF level measurement at the fixed end antenna 110 are entered into the Talk In portion of the Talk In-Out spreadsheet. Using embedded known equations, the distance between the reference site and the remote test location are calculated, along with the lower 3 db point, the distance to the lower 3 db point, the direction from the reference site to the remote test location, the test generator output, the receiving line loss, the receiving multi-coupler to the transmission line 114 loss, the fixed end antenna cable loss, the free space loss, the projected RF level, and the error.

Figure 6:
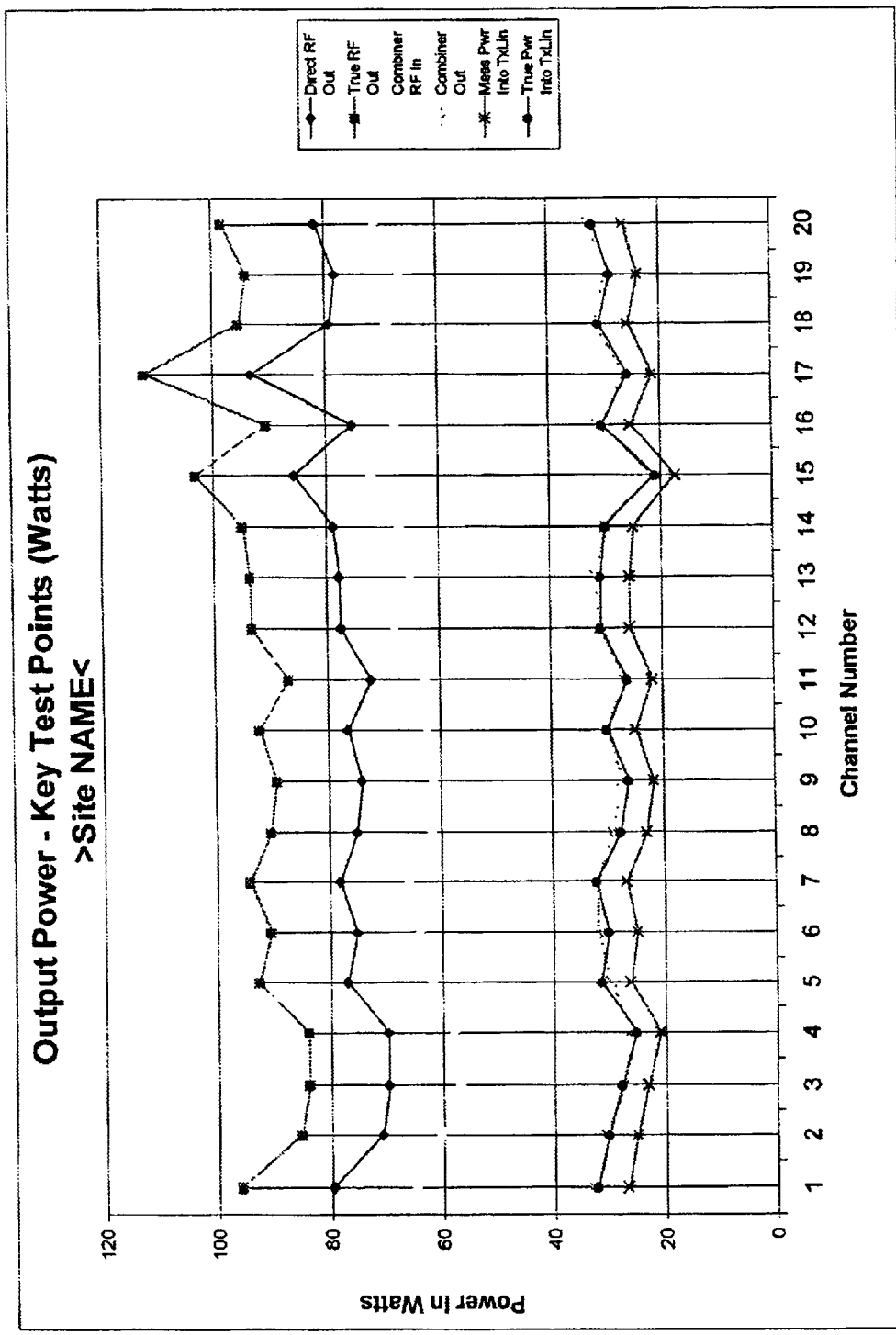
FIG. 6 is a graph of the output power for selected Test points for each transmitting channel using the data contained in the RF Doc spreadsheet of FIG. 4 and the Talk In-Out spreadsheet of FIG. 5.
Figure 7:
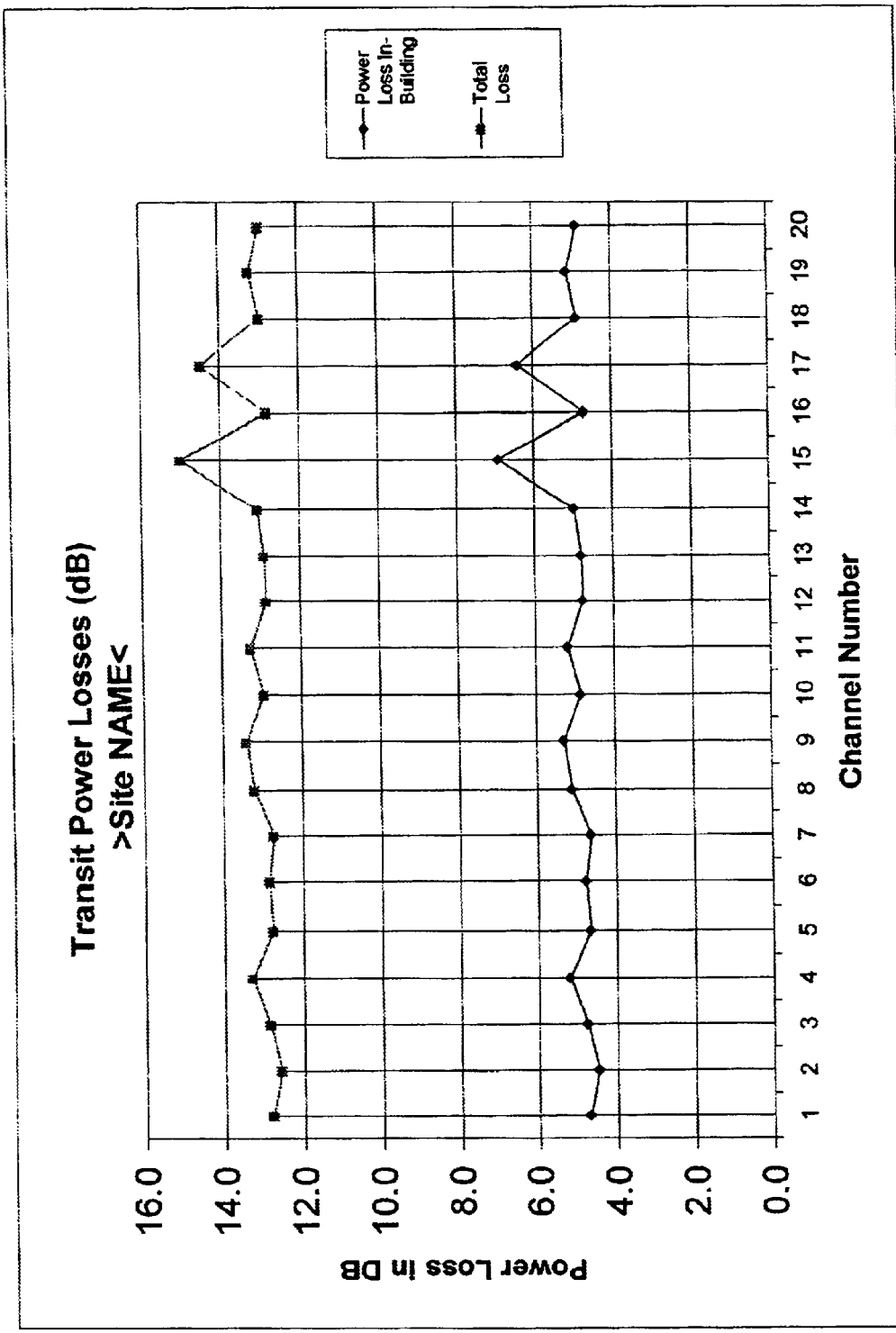
FIG. 7 is a graph of the combiner loss and cable loss for each transmitting channel using the data contained in the RF Doc spreadsheet of FIG. 4 and the Talk In-Out spreadsheet of FIG. 5.
Figure 8:
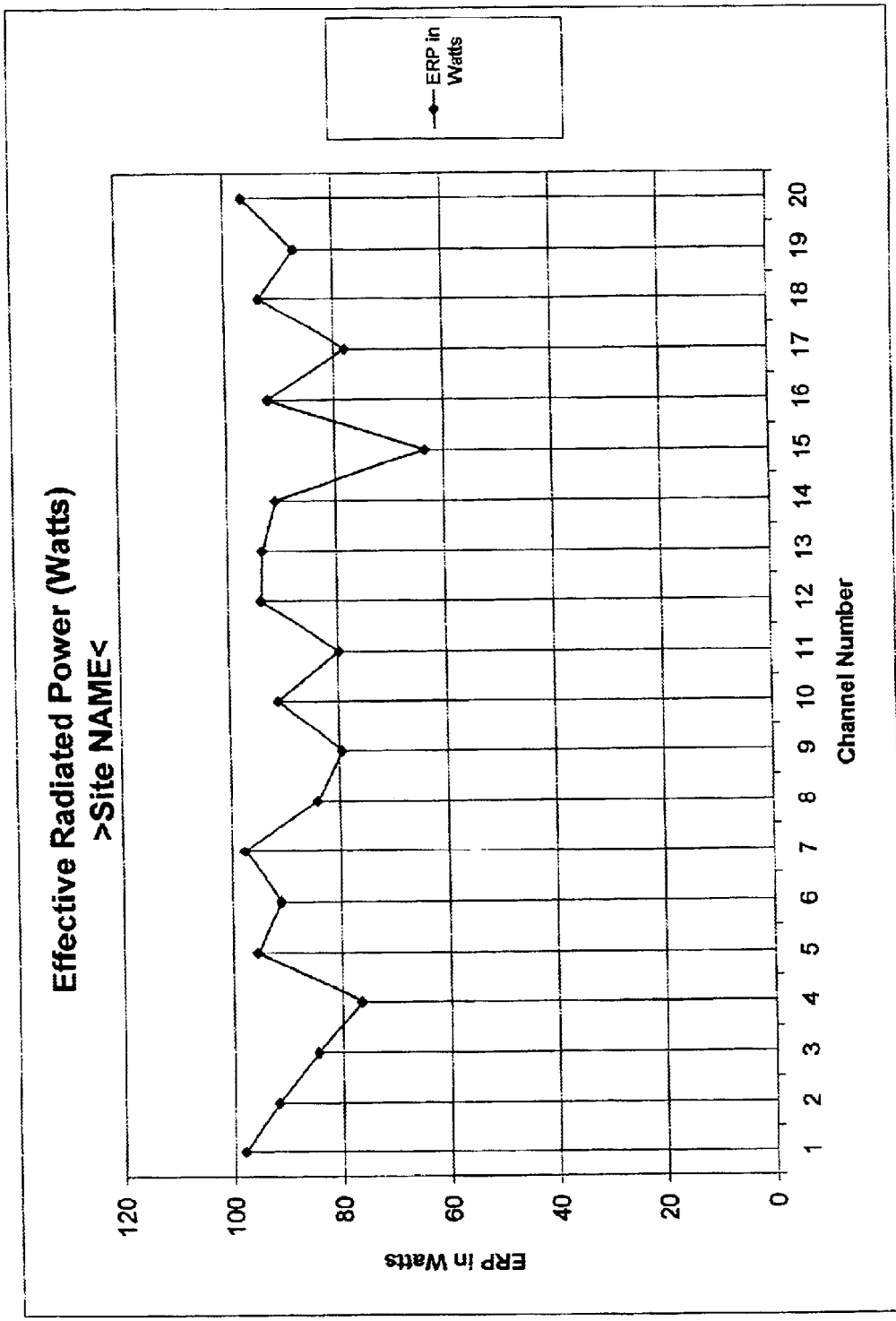
FIG. 8 is a graph of the total power transmitting loss out to transmission line input for each transmitting channel using the data contained in the RF Doc spreadsheet of FIG. 4 and the Talk In-Out spreadsheet of FIG. 5.
Figure 9:
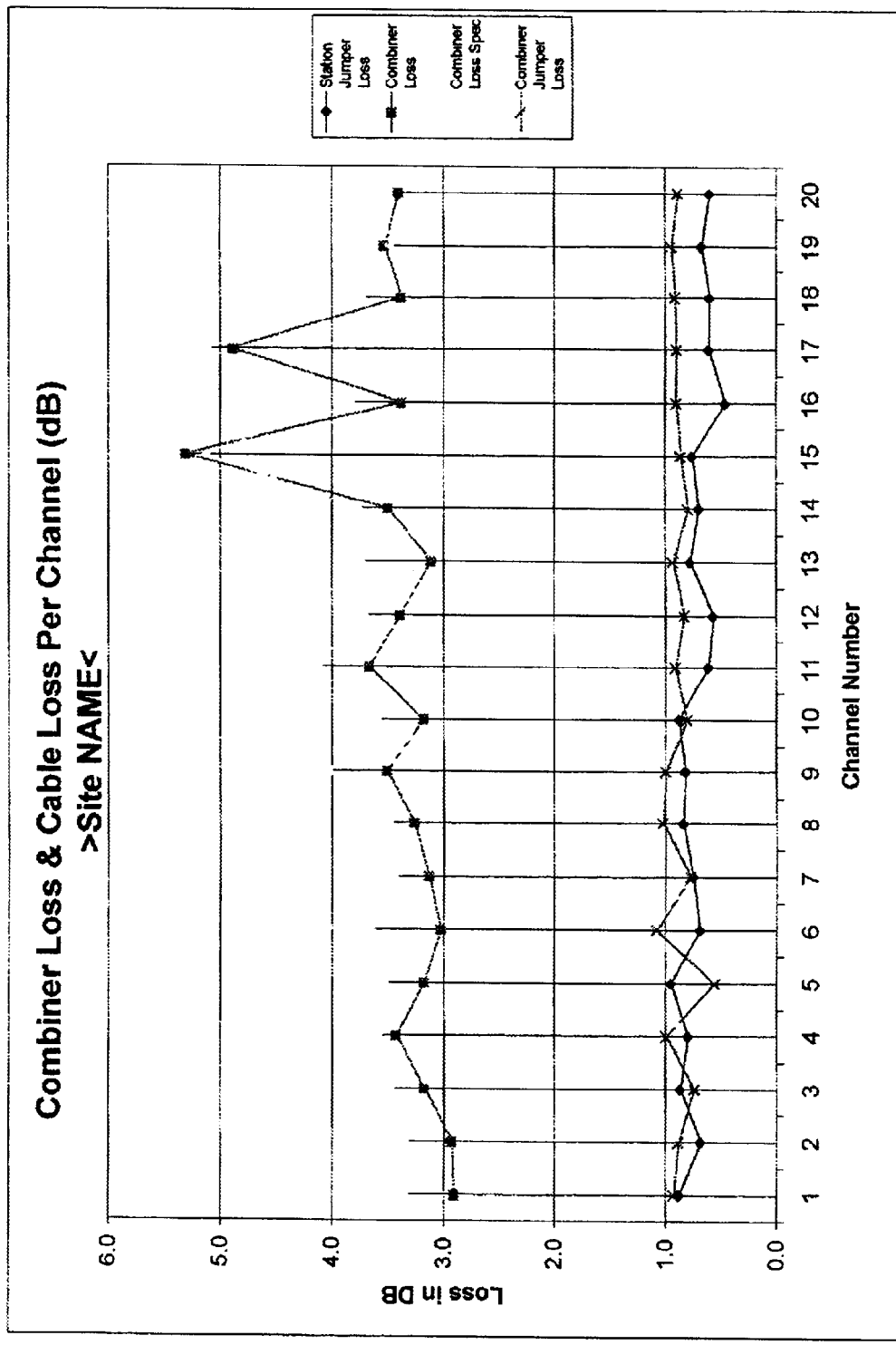
FIG. 9 is a graph of the effective radiated power in Watts for each transmitting channel using the data contained in the RF Doc spreadsheet of FIG. 4 and the Talk In-Out spreadsheet of FIG. 5.

FIGS. 6–17 are graphical representations of some the data entered and calculated by the process spreadsheet. FIG. 6 graphically represents the power for each channel, including the direct RF output, the true RF output, the combiner 106 RF input, the combiner 106 output, the measured power into the transmission line 114, and the true power into the transmission line 114. FIG. 7 graphically represents the combiner and cable loss per channel, including the station jumper 108 loss, the combiner 106 loss, the combiner loss spec, and the combiner pigtail 112 loss. FIG. 8 graphically represents the total power loss from the transmitter output to the transmission line 114 input per channel. FIG. 9 graphically represents the effective radiated power per channel.

Figure 10:
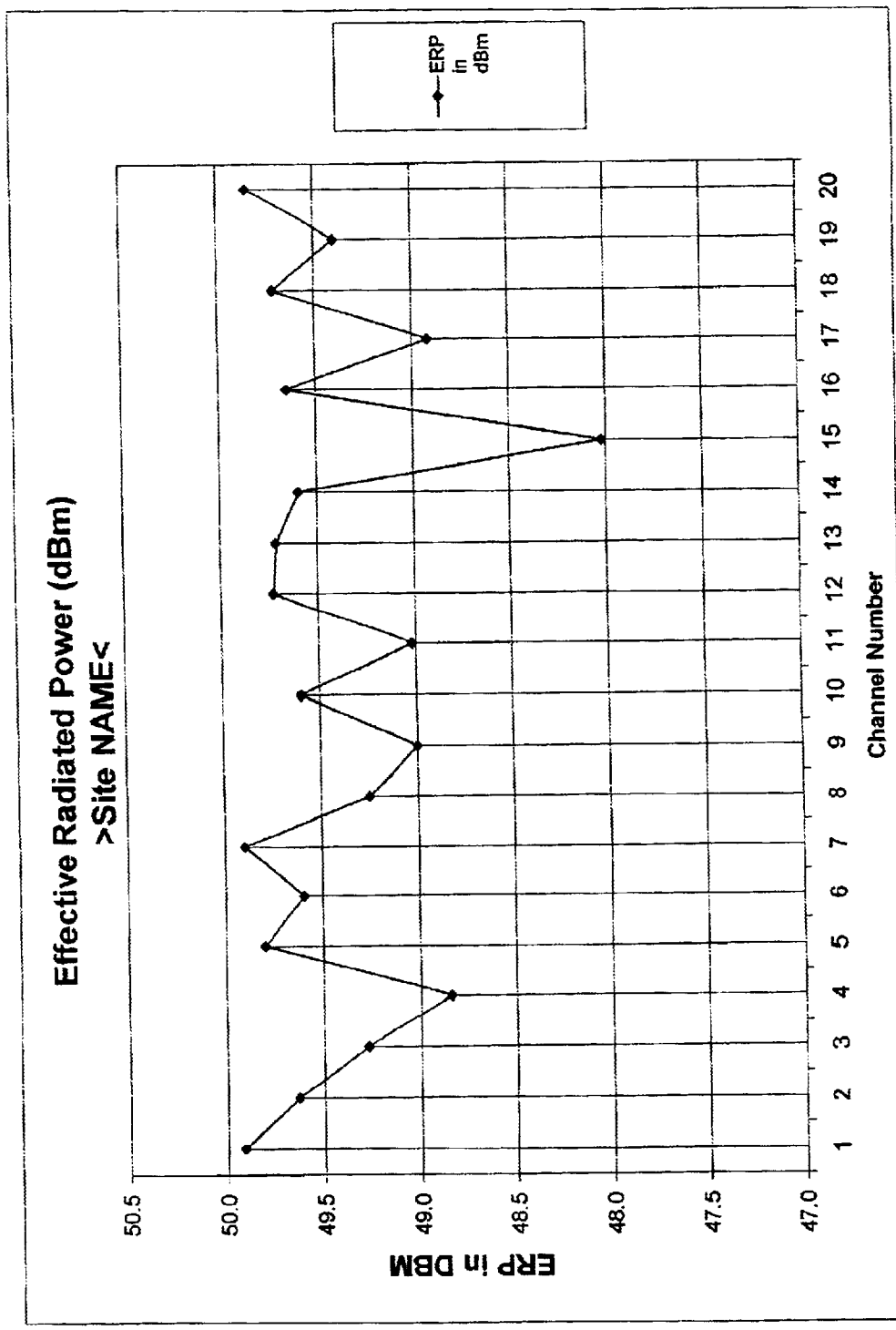
FIG. 10 is a graph of the effective radiated power in dBm for each transmitting channel using the data contained in the RF Doc spreadsheet of FIG. 4 and the Talk In-Out spreadsheet of FIG. 5.
Figure 11:
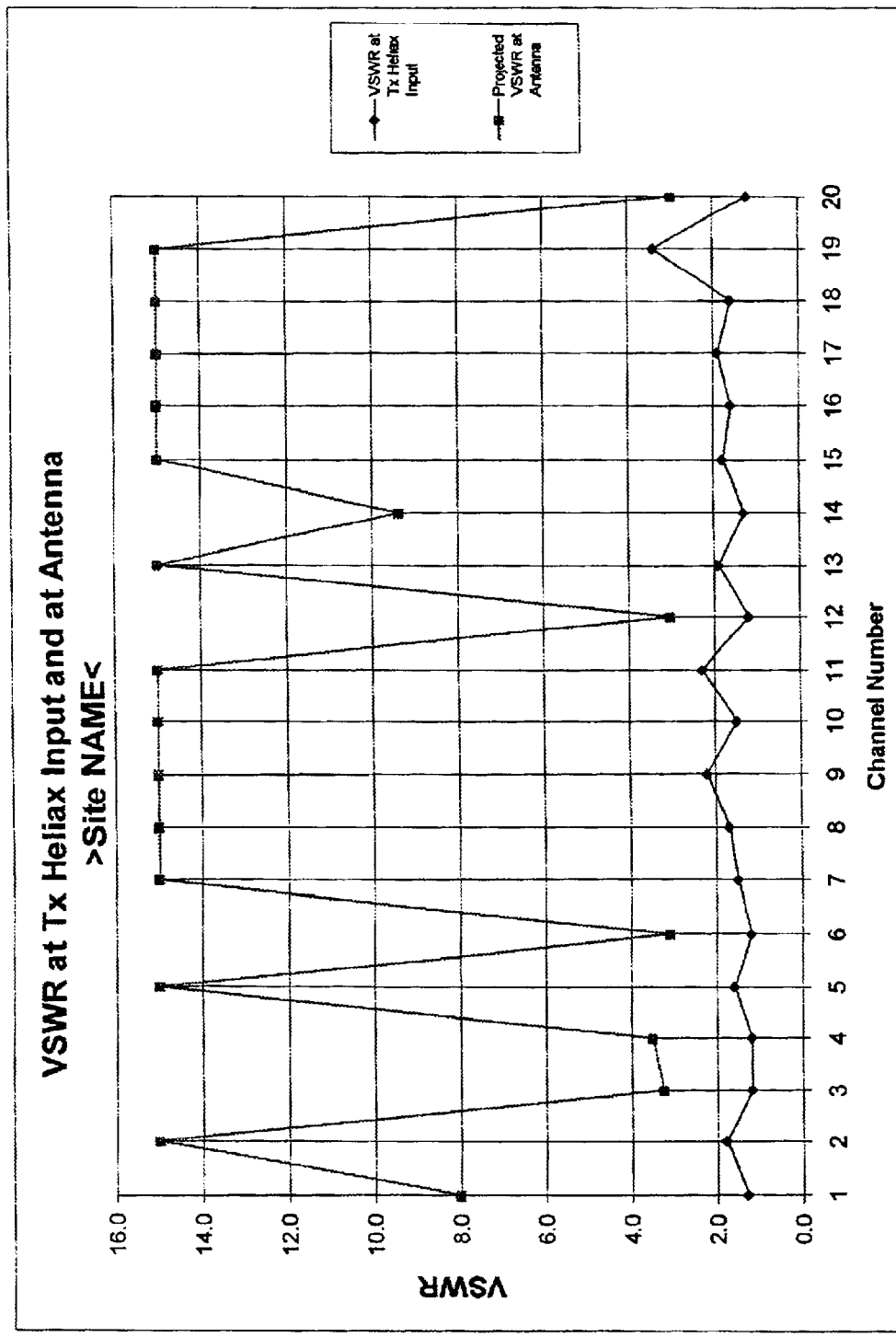
FIG. 11 is a graph of the VSWR at the transmission line input and at the antenna for each transmitting channel using the data contained in the RF Doc spreadsheet of FIG. 4 and the Talk In-Out spreadsheet of FIG. 5.
Figure 12:
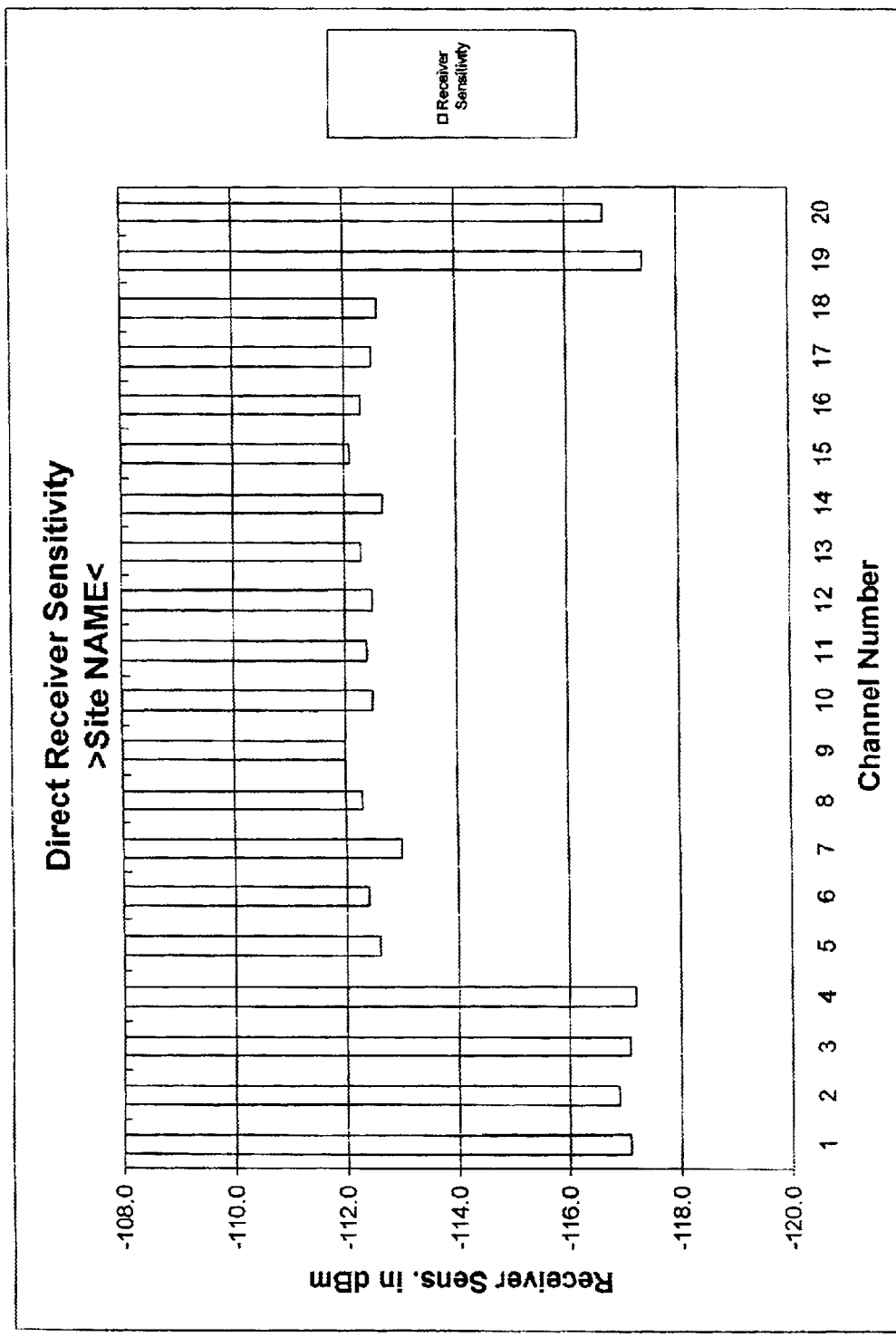
FIG. 12 is a graph of the variance from the site effective radiated power for each transmitting channel using the data contained in the RF Doc spreadsheet of FIG. 4 and the Talk In-Out spreadsheet of FIG. 5.
Figure 13:
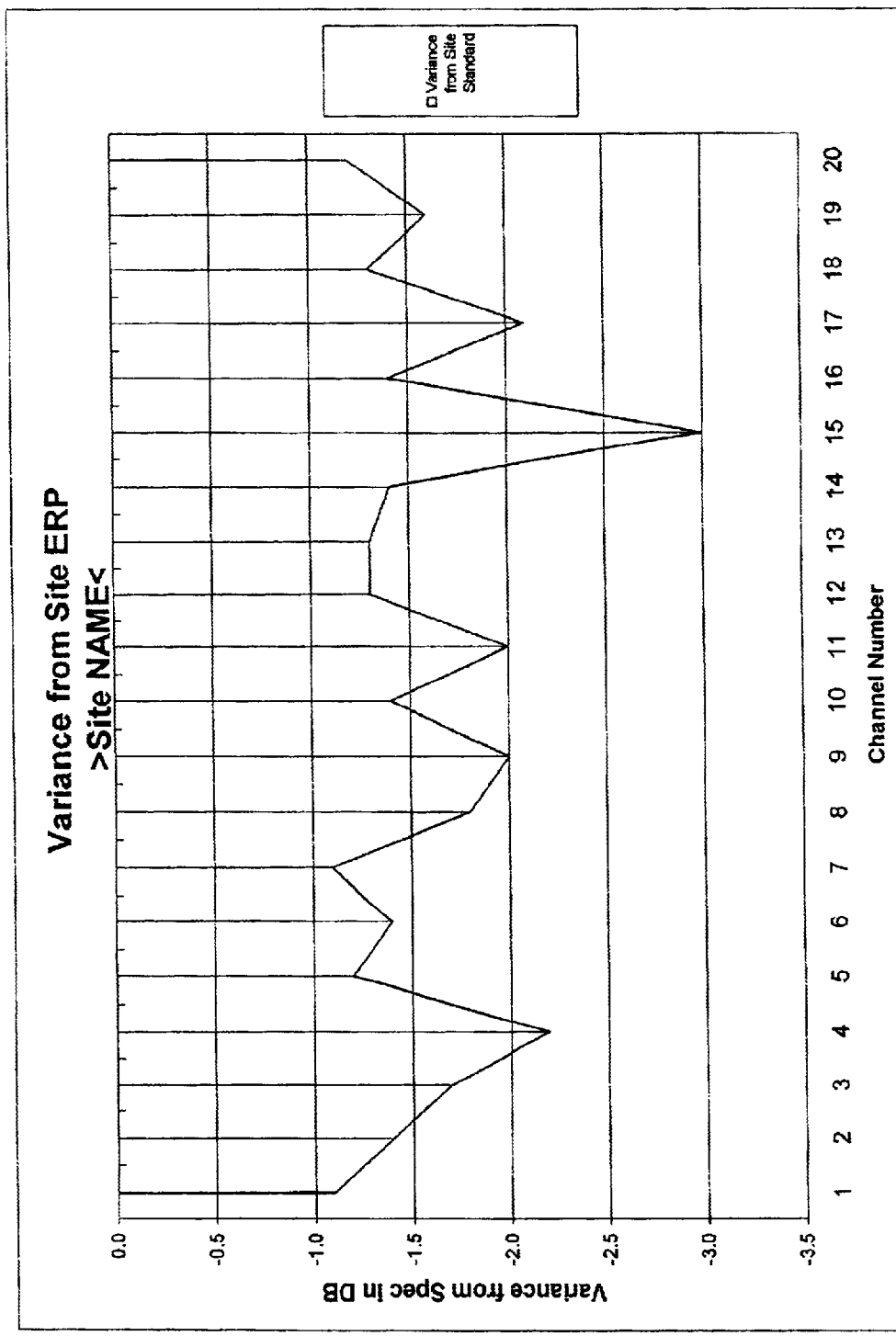
FIG. 13 is a graph of the direct receiver sensitivity for each transmitting channel using the data contained in the RF Doc spreadsheet of FIG. 4 and the Talk In-Out spreadsheet of FIG. 5.

FIG. 10 graphically represents the effective radiated power per channel at a first test site. FIG. 11 graphically represents the VSWR at the transmission line 114 input per channel at a first antenna test site. FIG. 12 graphically represents the variance from the reference site ERP per channel at a first antenna test site. FIG. 13 graphically represents the direct receiver sensitivity per channel at a first antenna test site.

Figure 14:
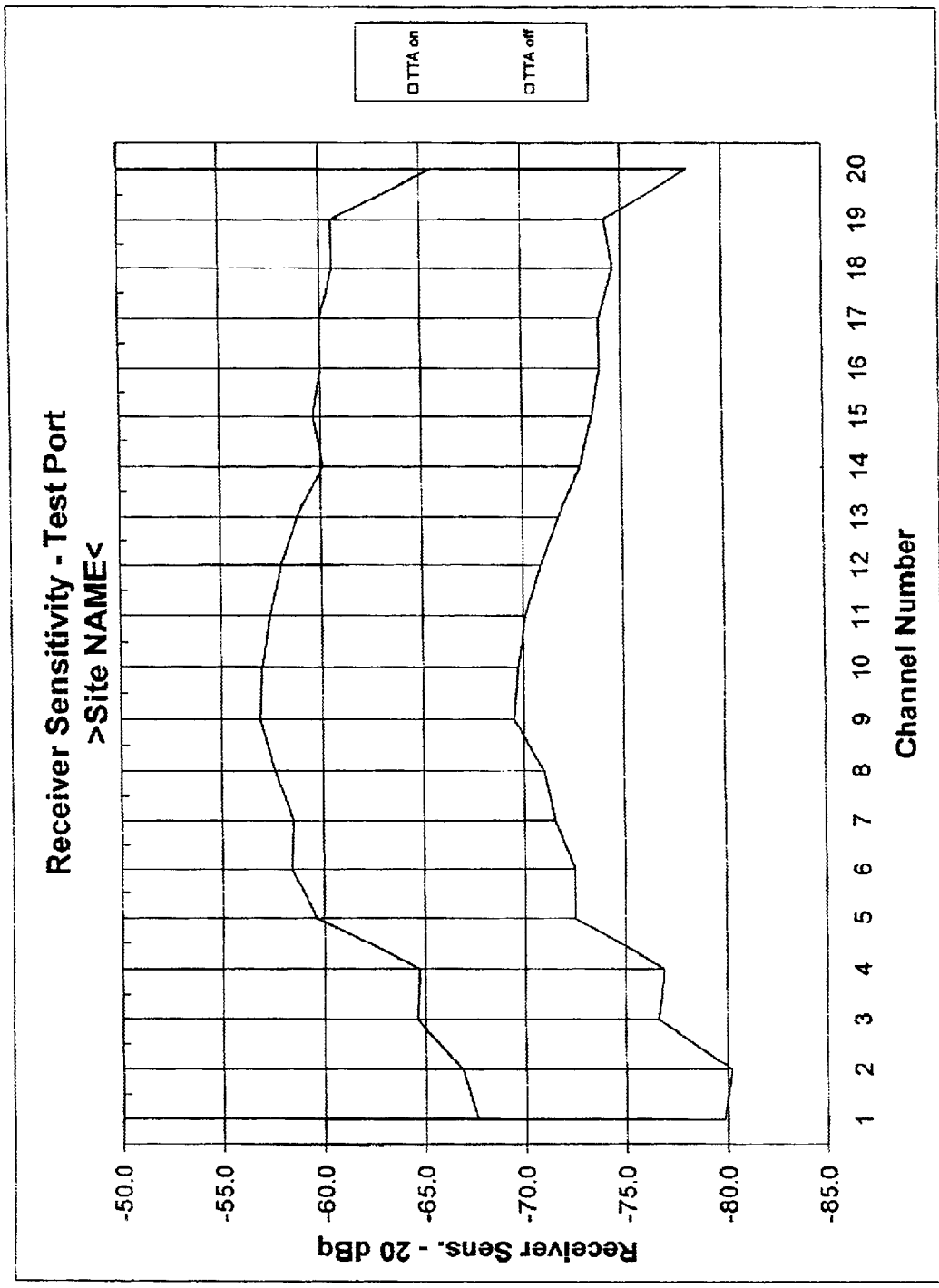
FIG. 14 is a graph of the receiver sensitivity for each transmitting channel using the data contained in the RF Doc spreadsheet of FIG. 4 and the Talk In-Out spreadsheet of FIG. 5.
Figure 15:
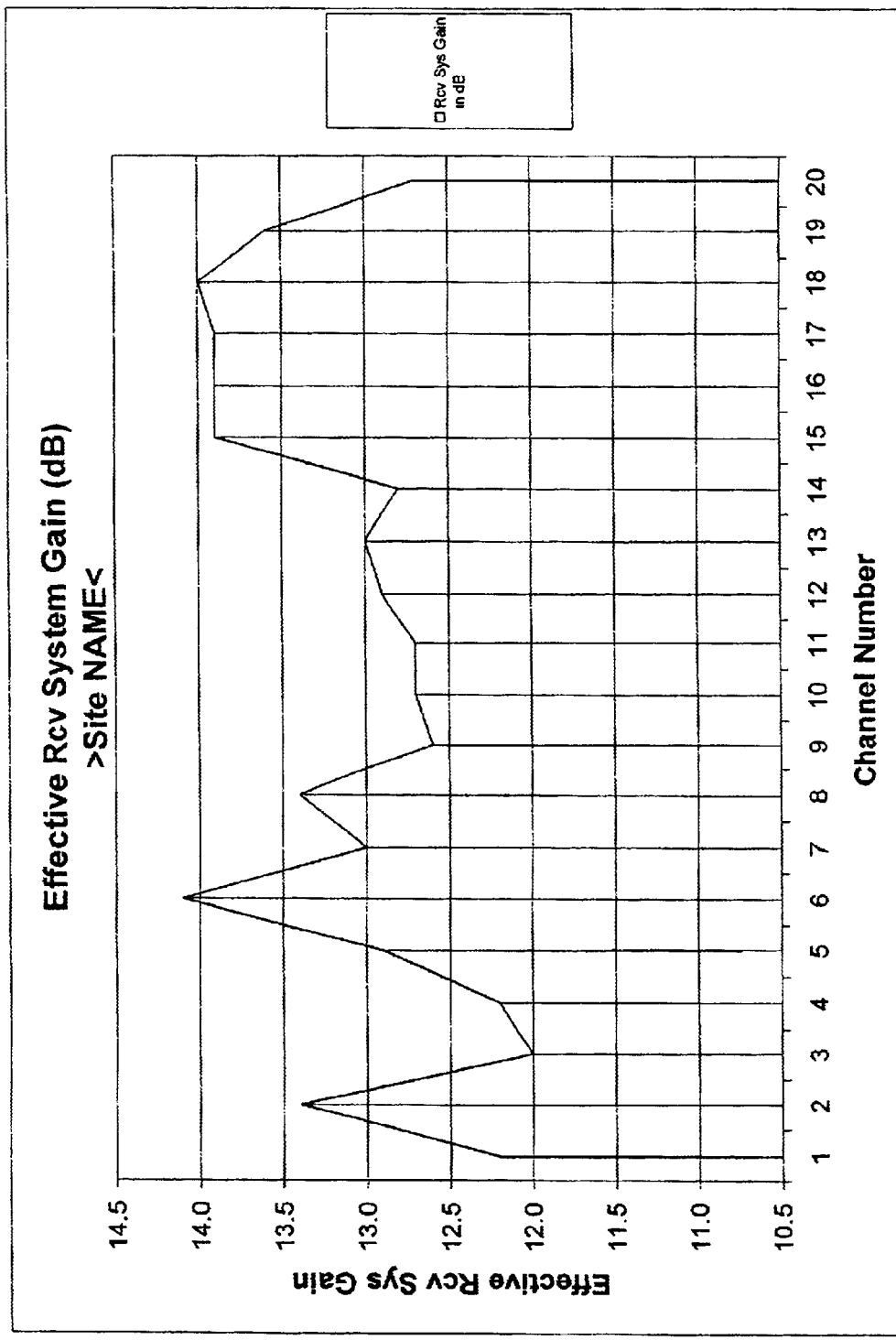
FIG. 15 is a graph of the effective receive system gain for each transmitting channel using the data contained in the RF Doc spreadsheet of FIG. 4 and the Talk In-Out spreadsheet of FIG. 5.
Figure 16:
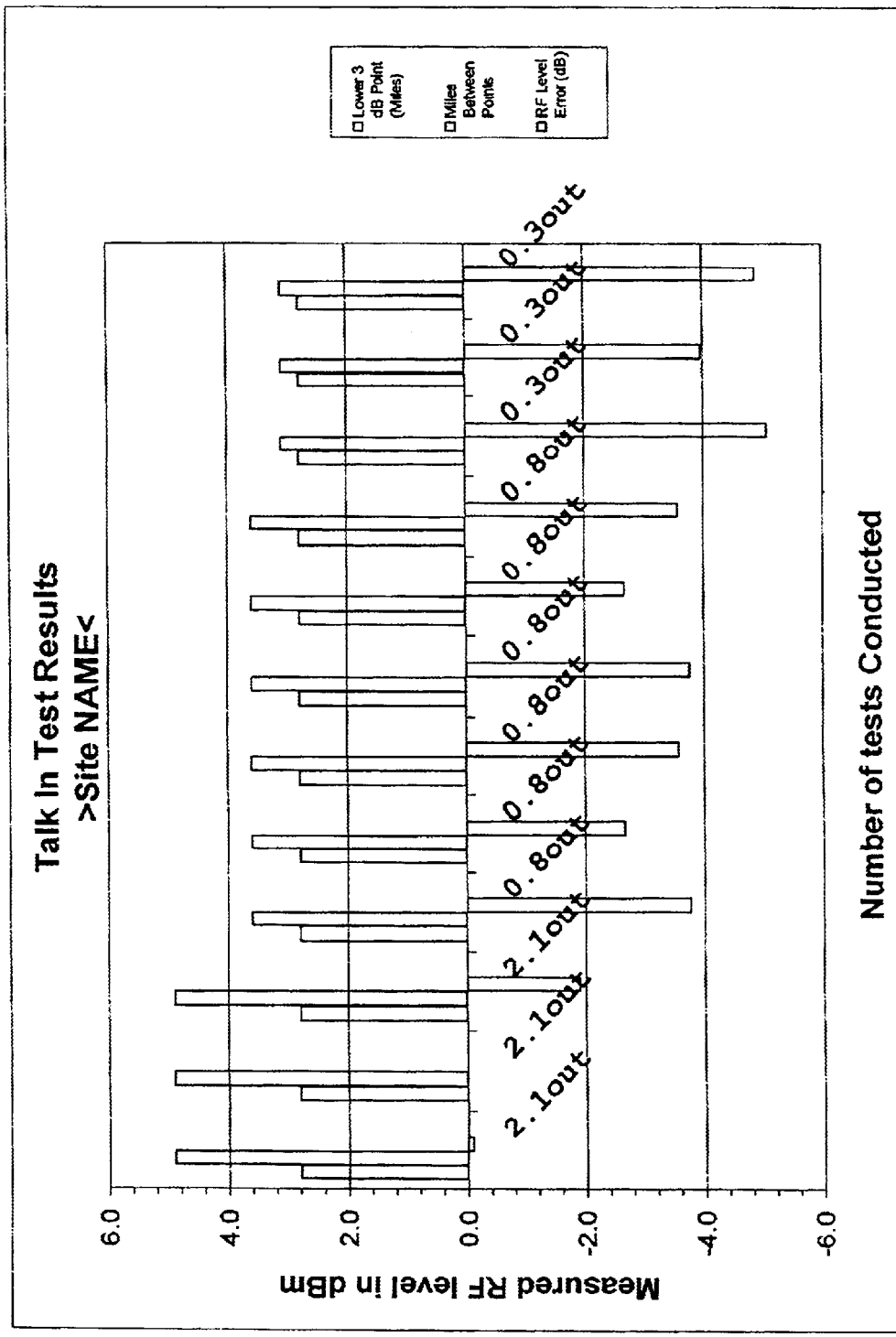
FIG. 16 is a graph of the Talk In test results using the data contained in the RF Doc spreadsheet of FIG. 4 and the Talk In-Out spreadsheet of FIG. 5.
Figure 17:
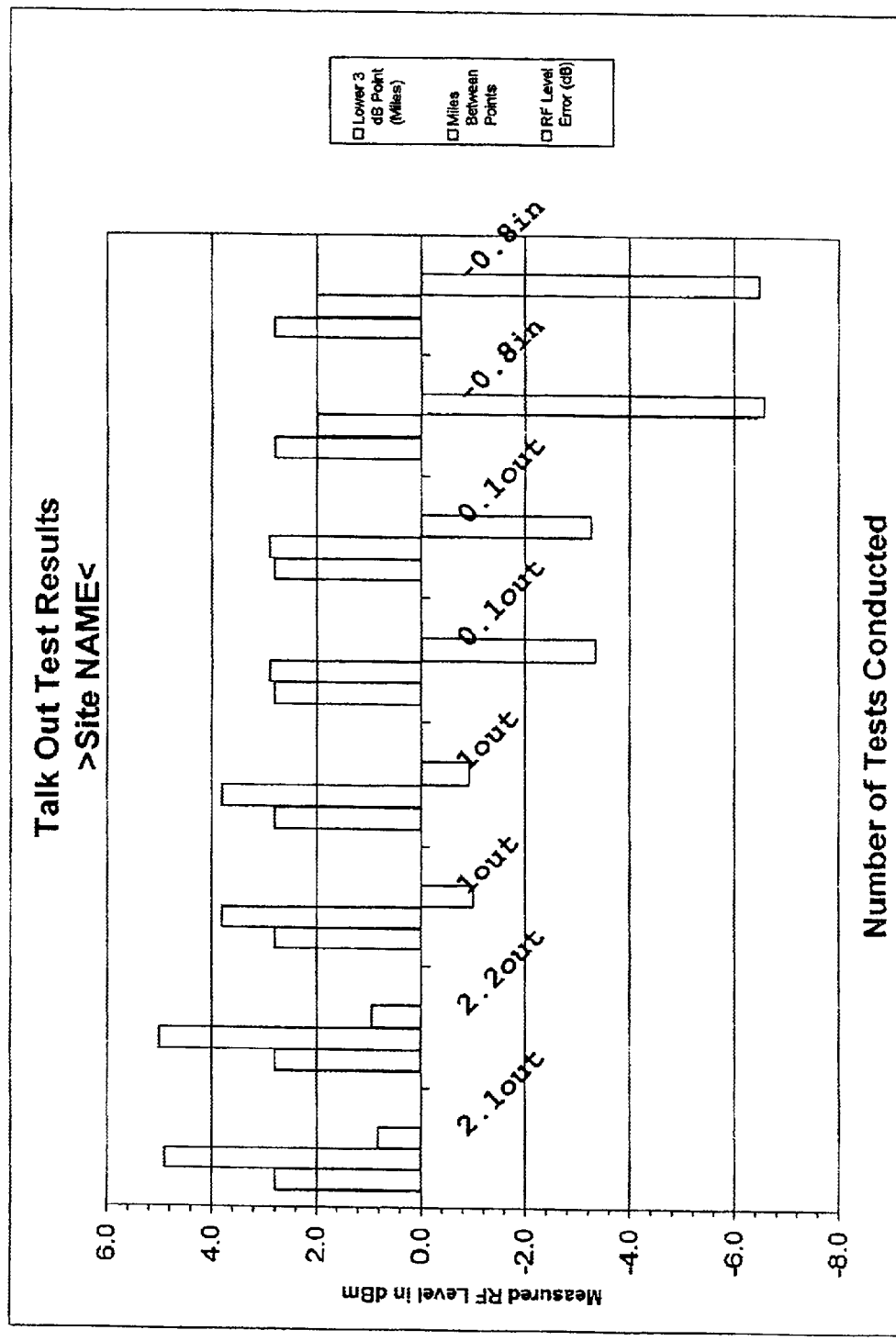
FIG. 17 is a graph of the Talk Out test results using the data contained in the RF Doc spreadsheet of FIG. 4 and the Talk In-Out spreadsheet of FIG. 5.

FIG. 14 graphically represents the receiver sensitivity per channel at a first test site. FIG. 15 graphically represents the effective receiver system gain per channel at a first test site. FIG. 16 graphically represents the Talk In test results showing the measured RF level per test and illustrating the lower 3 db point, the distance between the reference site and the remote test location, and the RF level error. FIG. 17 graphically represents the Talk Out test results showing the measured RF level per test and illustrating the lower 3 db point, the distance between the reference site and the remote test location, and the RF level error.

7. RF Doc Spreadsheet—Formula List.

The following is a list of formulas located at top of each column that contains calculations as well as several other key locations. The formulas located at the top cell of each column are basically copied down the page to provide calculations in the required cells. The formulas that are copied down the page are not shown in this list because they are duplicates, with only minor changes, to the formulas shown below. The Cell location corresponds to the cells on FIG. 4.

| Cell | Formula |
|---|---|
| K6 | IF(OR(K4=0,K4=""),"", K4/100*K5+2*$AG$3) |
| L6 | IF(OR(L4=0,L4=""),"", L4/100*L5+2*$AG$3) |
| M6 | IF(OR(M4=0,M4=""),"", M4/100*M5+2*$AG$3) |
| N6 | IF(OR(N4=0,N4=""),"", N4/100*N5+2*$AG$3) |
| K9 | IF(ISERR(SUMIF($D$15:$D$42,"=1",$T$15:$T$42)/COUNTIF($D$15:$D$42,"=1")),"", SUMIF($D$15:$D$42,"=1",$T$15:$T$42)/COUNTIF($D$15:$D$42,"=1")) |
| L9 | IF(ISERR(SUMIF($D$15:$D$42,"=2",$T$15:$T$42)/COUNTIF($D$15:$D$42,"=2")),"",SUMIF($D$15:$D$42,"=2",$T$15:$T$42)/COUNTIF($D$15:$D$42,"=2")) |
| M9 | IF(ISERR(SUMIF($D$15:$D$42,"=3",$T$15:$T$42)/COUNTIF($D$15:$D$42,"=3")),"",SUMIF($D$15:$D$42,"=3",$T$15:$T$42)/COUNTIF($D$15:$D$42,"=3")) |
| N9 | IF(ISERR(SUMIF($D$15:$D$42,"=4",$T$15:$T$42)/COUNTIF($D$15:$D$42,"=4")),"",SUMIF($D$15:$D$42,"=4",$T$15:$T$42)/COUNTIF($D$15:$D42,"=4")) |
| W4 | IF(V4="d","dBm",IF(V4="w","dBw"," < d or w?")) |
| V5 | IF(OR(V$3=0,V$3=""),"",IF(V4="d",10*LOG(V3/0.001),IF(V4="w",10*LOG(V3),""))) |
| W5 | IF(V4="d","dBm",IF(V4="w","dBw"," <d or w?")) |
| V8 | IF(OR(V6="",V6=0,V7="",V7=0),0.05,0.05+V6*V7/100) |
| Z5 | Z4+AA4/12 |
| Z7 | IF(AND(Z4=0,AA4=0),0,Z5*Z6/100+2*AG3) |
| T13 | IF(V4="d","Watts / dBm",IF(V4="w","Watts / dBw","Watts / ")) |
| C15 | IF(D15="x","x",IF(AND(B15>0,B15<200),10^A(Z$7/10)*B15,"")) |
| F15 | IF(D15="x","x",IF(AND(B15>0,E15>0,B15<>"",E15<>""),ABS(10*LOG(E15/B15)),"")) |
| H15 | IF(D15="x","x",IF(AND(E15>0,G15>0,E15<>"",G15<>""),ABS(10*LOG(G15/E15)),"")) |
| J15 | IF(D15="x","x",IF(OR(H15="",I15=""),"",H15–I15)) |
| K15 | IF(D15="x","x",IF(AND(G15>0,L15>0,G15<>"",L15<>""),ABS(10*LOG(L15/G15)),"")) |
| M15 | IF(D15="x","x",IF(AND(L15<>0,L15<>""), 10^(Z$7/10)*L15,"")) |
| O15 | IF(D15="x","x",IF(AND(N15<>0,N15<>""),IF(N15=0,0,IF(AND(L15<>0,N15<>0,L15>N15),ROUND((1+SQRT(N15/L15))/(1-SQRT(N15/L15)),1),0)),"")) |
| P15 | IF(D15="x","",IF(OR(O15="",O15=0),"",":1")) |
| Q15 | IF(AG15="","",IF(AND(AG15>=0,AG15<=15),AG15,">")) |
| R15 | IF(D15="x","x",IF(AG15="","",IF(AND(AG15>0,AG15<=15),AG15,15))) |

-continued

| Cell | Formula |
|---|---|
| S15 | IF(D15="x","",IF(OR(R15="",R15=0),"",":1")) |
| T15 | IF(D15="x","x",IF(OR($B15="",$E15="",$B15=0,$E15=0),"", CHOOSE(D15,(M15*10^((K$3-K$6-K$7-K$8-V$8-V$9/10)), (M15*10^((L$3-L$6-L$7-L$8-V$9)/10)),M15*10^((M$3-M$6-M$7-M$8-V$9)/10),M15*10^((N$3-N$6-N$7-N$8-V$9)/10),""))) |
| U15 | IF(D15="x","x",IF(AND(V$4<>"d",V$4<>"w"),"", (IF(V$4="d",IF(T15="","",10*LOG(T15/0.001)), IF(T15="","",10*LOG(T15)))))) |
| V15 | IF(D15="x","",IF(OR(V$3="",V$3=0,T15=""),"",T15-$V$3)) |
| W15 | IF(D15="x","x",IF(OR(V$3="",V$3=0,V15=""),"", ROUND(10*LOG(T15/$V$3),1))) |
| AB15 | IF(OR(Y15="",Z15=""),"",ABS(Y15-Z15)) |
| AE15 | IF(AND(D15>=1,D15<=4,L15>0,N15>0),CHOOSE(D15, M15*10^(-(K$6+K$7)/10),M15*10^(-(L$6+L$7)/10), M15*10^(-(M$6+M$7)/10), M15*10^(-(N$6+N$7)/10)), 0) |
| AF15 | IF(AE15=0,0,CHOOSE(D15,N15*10^((K$6+K$7)/10), N15*10^((L$6+L$7)/10),N15*10^((M$6+M$7)/10), N15*10^((N$6+N$7)/10))) |
| AG15 | IF(AE15>0,(1+SQRT(AF15/AE15))/(1-SQRT(AF15/AE15)),"") |
| AH15 | IF(D15="x","x",IF(AND(B15=0,L15=0),"", 10*LOG(B15/L15))) |
| B45 | SUM(B15:B42)/COUNTIF(B15:B42,">0") |
| C45 | SUM(C15:C42)/COUNTIF(C15:C42,">0") |
| E45 | SUM(E15:E42)/COUNTIF(E15:E42,">0") |
| F45 | SUM(F15:F42)/COUNTIF(F15:F42,">0") |
| G45 | SUM(G15:G42)/COUNTIF(G15:G42,">0") |
| H45 | SUM(H15:H42)/COUNTIF(H15:H42,">0") |
| I45 | SUM(I15:I42)/COUNTIF(I15:I42,">0") |
| J45 | SUM(J15:J42)/COUNTIF(J15:J42,">-200") |
| K45 | SUM(K15:K42)/COUNTIF(K15:K42,">0") |
| L45 | SUM(L15:L42)/COUNTIF(L15:L42,">0") |
| M45 | SUM(M15:M42)/COUNTIF(M15:M42,">0") |
| M45 | SUM(N15:N42)/COUNTIF(N15:N42,">0") |
| O45 | SUM(O15:O42)/COUNTIF(O15:O42,">0") |
| P45 | IF(OR(O45="",O45=0),"",":1") |
| Q45 | IF(COUNTIF(Q15:Q42,"=>")>=1,">","") |
| R45 | SUM(R15:R42)/COUNTIF(R15:R42,">0") |
| S45 | IF(R45="","",":1") |
| T45 | SUM(T15:T42)/COUNTIF(T15:T42,">0") |
| U45 | SUM(U15:U42)/COUNTIF(U15:U42,">0") |
| V45 | SUM(V15:V42)/COUNTIF(V15:V42,">-200") |
| W45 | SUM(W15:W42)/COUNTIF(W15:W42,">-200") |
| X45 | SUM(X15:X42)/COUNTIF(X15:X42,">-200") |
| Y45 | SUM(Y15:Y42)/COUNTIF(Y15:Y42,">-200") |
| Z45 | SUM(Z15:Z42)/COUNTIF(Z15:Z42,">-200") |
| AB45 | SUM(AB15:AB42)/COUNTIF(AB15:AB42,">-200") |

8. Talk In-Out Doc Spreadsheet—Formula List.

The following is a list of formulas located at top of each column that contains calculations as well as several other key locations. The formulas located at the top cell of each column are basically copied down the page to provide calculations in the required cells. The formulas that are copied down the page are not shown in this list because they are duplicates, with only minor changes, to the formulas shown below. The Cell location corresponds to the cells on FIG. 5.

| Cell | Formula |
|---|---|
| J11 | IF(K9=0"Horizon:","Beam Ctr:") |
| K10 | IF(OR(K$6<=Q,K$6="",K8="",K8<0,K9="",K9<0)"", IF(K9="","",ROUND(K$6/5280/TAN(ABS(K9+ (K$8/2))*$AH27),1))) |
| L10 | IF(OR(L$6<=0,L6="",L8="",L8<0,L9="",L9<0),"",IF(L9="", "",ROUND(L$6/5280/TAN(ABS(L9+(L$8/2))*$AH27),1))) |
| M10 | IF(OR(M$6<=0,M6="",M8="",M8<0,M9="",M9<0),"", IF(M9="","",ROUND(M$6/5280/ TAN(ABS(M9+(M$8/2))*$AH27),1))) |

-continued

| Cell | Formula |
|---|---|
| N10 | IF(OR(N$6<=0,N$6="",N8="",N8<0,N9="",N9<0),"", IF(N9="","",ROUND(N$6/5280/TAN(ABS(N9+ (N$8/2))*$AH27),1))) |
| K11 | IF(OR(K6<=0,K6="",K8="",K9="",K9<0),"",IF(K$9<=0.2, SQRT(2*K$6),ROUND(K$6/5280/TAN(ABS(K9)*$AH27),1))) |
| L11 | IF(OR(L6<=0,L6="",L8="",L9="",L9<0),"",IF(L$9<=0.2, SQRT(2*L$6),ROUND(L$6/5280/TAN(ABS(L9)*$AH27),1))) |
| M11 | IF(OR(M6<=0,M6="",M8="",M9="",M9<0),"",IF(M$9<=0.2, SQRT(2*M$6),ROUND(M$6/5280/ TAN(ABS(M9)*$AH27),1))) |
| N11 | IF(OR(N6<=0,N6="",N8="",N9="",N9<0),"",IF(N$9<=0.2, SQRT(2*N$6),ROUND(N$6/5280/TAN(ABS(N9)*$AH27),1))) |
| S11 | (IF(OR(S5="",S6="",S5=0,S6=0),"",IF(OR(S5="",S5=0,S9="", S9=0),AK27,3*AK27*S9/100*S10))) |
| T11 | (IF(OR(T5="",T6="",T5=0,T6=0),"",IF(OR(T5="",T5=0,T9="", T9=0),AK27,3*AK27*T9/100*T10))) |
| U11 | (IF(OR(U5="",U6="",U5=0,U6=0),"",IF(OR(U5="",U5=0, U9="",U9=0),AK27,3*AK27*U9/100*U10))) |
| V11 | (IF(OR(V5="",V6="",V5=0,V6=0),"",IF(OR(V5="",V5=0, V9="",V9=0),AK27,3*AK27*V9/100*V10))) |
| Z8 | Z7+AA7/12 |
| Z10 | IF(AND(Z7=0,AA7=0),0,2*AK27*Z8/100*Z9) |
| K17 | IF(OR(C17="",D17="",E17="",G17="",H17="",I17=""),"", IF(OR(C$15="",D$15="",E$15="",G$15="",H$15="",I$15="", I$15=""),"",IF(J17="x","x",IF(AND(B17<>"N",B17<>"S"), "N / S ?",IF(AND(F17<>"E",F17<>"W"),"E / W ?", IF(AND(B$15<>"N",B$15<>"S"),"N / S ?", IF(AND(F$15<>"E",F$15<>"W"),"E / W ?",AJ17)))))) |
| L17 | (IF(K17="x","x",IF(AND(C17="",D17="",E17="",G17="", H17"",I17=""),"",IF(J17=1,K$10,IF(J17=2,L$10, IF(J17=3,M$10,IF(J17=4,N$10,""))))))) |
| M17 | IF(K17="x","x",IF(AND(K$6="",L$6="",M$6="", N$6=""), "",IF(L17="","",IF(K17-L17<0,ROUND((K17-L17),1)&"in", IF(K17-L17>0,ROUND((K17-L17),1)&"out",IF(K17-L17=0, "@ 3db pt","oops")))))) |
| N17 | IF(K17="x","x",IF(OR(K17=0,K17=""),"",AK17)) |
| O17 | IF(K17="x","x",IF(OR(K17=0,K17=""),"",N17+180)) |
| S17 | IF(K17="x","x",IF(J17="","",CHOOSE(J17,2*AK$27+S$5/ 100*S$6,2*AK$27+T$5/100*T$6,2*AK$27+U$5/ 100*U$6,2*AK$27+V$5/100*V$6))) |
| V17 | (IF(K17="x","x",IF(J17="","",CHOOSE(J17,2*AK$27+S$7/ 100*S$8,2*AK$27+T$7/100*T$8,2*AK$27+u$7/ 100*u$8,2*AK$27+v$7/100*V$8)))) |
| X17 | IF(K17="x","x",IF(OR(K17=0,K17="",Q17=""),"", AK$29+20*(LOG(K17)+LOG(Q17)))) |
| Y17 | IF(K17="x","x",IF(L17="","",10*LOG(R17/0.001)+ CHOOSE(J17,K$5,L$5,M$5,N$5)+$E$11-S17-T17-CHOOSE(J17,S$11,T$11,U$11,V$11)-U17-V17-Z$10-Z$11-W17-X17)) |
| AB17 | IF(K17="x","x",IF(OR(J17>4,Y17=""),"",IF(K17=0,0, ABS(Y17)-ABS(Z17)))) |
| AE15 | IF(B15="N",(C15+D15*$AH$29+E15*$AH$30),IF(B15="S",-(C15+D15*$AH$29+E15*$AH$30),0)) |
| AF15 | IF(F15="E",-(G15+H15*$AH$29+I15*$AH$30), IF(F15="W",(G15+H15*$AH$29+I15*$AH$30),0)) |
| AG15 | (AE15*AH$27) |
| AH15 | (AF15*AH$27) |
| AE17 | IF(B17="N",(C17+D17*$AH$29+E17*$AH$30), IF(B17="S",-(C17+D17*$AH$29+E17*$AH$30),0)) |
| AF17 | IF(F17="E",-(G17+H17*$AH$29+I17*$AH$30), IF(F17="W",(G17+H17*$AH$29+I17*$AH$30),0)) |
| AG17 | (AE17*AH$27) |
| AH17 | (AF17*AH$27) |
| AI17 | (ACOS(SIN(AG$15)*SIN(AG17)+(COS(AG$15)*COS(AG17)* COS(ABS(AH$15-AH17))))*AH$28) |
| AJ17 | ROUND(AI17*AK28,1) |
| AK17 | ROUND((ACOS((SIN(AG17)-(SIN(AG$15)*COS(AI17/ AH$28)))/(COS(AG$15)*SIN(AI17/AH$28)))*AH$28),2) |
| K33 | IF(OR(K$29<=0,K$29="",K31="",K31<0,K32="", K32<0, "",IF(K32="","",ROUND(K$29/5280/TAN(ABS(K32+ (K$31/2))*$AH$27),1))) |
| L33 | IF(OR(L$29<=0,L$29="",L31="",L31<0,L32="",L32<0),"", IF(L32="","",ROUND(L$29/5280/ TAN(ABS(L32+(L$31/2))*$AH$27),1))) |
| M33 | IF(OR(M$29<=0,M$29="",M31="",M31 <0,M32="", M32=0), "",IF(M32="","",ROUND(M$29/5280/TAN(ABS(M32+ (M$31/2))*$AH$27),1))) |

-continued

| Cell | Formula |
|---|---|
| N33 | IF(OR(N$29<=0,N$29="",N31="",N31<0,N32="",N32<0),"", IF(N32="","",ROUND(N$29/5280/TAN(ABS(N32+ (N$31/2))*$AH$27),1))) |
| J34 | IF(K32=0,"Horizon:","Beam Ctr:") |
| K34 | IF(OR(K29=0,K29="",K31="",K32="")),"",IF(K32="","", IF(K$32<=0.2,SQRT(2*K$29),ROUND(K$29/5280/ TAN(ABS(K32)*$AH$27),1)))) |
| L34 | IF(OR(L29=0,L29="",L31="",L32="")),"",IF(L32="","", IF(L$32<=0.2,SQRT(2*L$29),ROUND(L$29/5280/ TAN(ABS(L32)*$AH$27),1)))) |
| M34 | IF(OR(M29=0,M29="",M31="",M32="")),"",IF(M32="","", IF(M$32<0.2,SQRT(2*M$29),ROUND(M$29/5280/ TAN(ABS(M32)*$AH$27),1)))) |
| N34 | IF(OR(N29=0,N29="",N31="",N32="")),"",IF(N32="","", IF(N$32<=0.2,SQRT(2*$29),ROUND(N$29/5280/ TAN(ABS(N32)*$AH$27),1)))) |
| S34 | (IF(OR(S28="",S29="",S28=0,S29=0),"",IF(OR(S28="",S28=0, S32="",S32=0),AK27,3*AK27+S32/100*S33))) |
| T34 | (IF(OR(T28="",T29="",T28=0,T29=0),"",IF(OR(T28="", T28=0,T32="",T32=0),AK27,3*AK27+T32/100*T33))) |
| U34 | (IF(OR(U28="",U29="",U28=0,U29=0),"",IF(OR(U28="", U28=0,U32="",U32=0),AK27,3*AK27+U32/100*U33))) |
| V34 | (IF(OR(V28="",V29="",V28=0,V29=0),"",IF(OR(V28="", V28=0,V32="",V32=0),AK27,3*AK27+V32/100*V33))) |
| Z29 | Z28+AA28/12 |
| Z31 | IF(AND(Z27=0,AA27=0),0,2*AK27+Z29/100*Z30) |
| AE38 | IF(B38="N",(C38+D38*$AH$29+E38*$AH$30),IF(B38="S",- (C38+D38*$AH$29+E38*$AH$30),0)) |
| AF38 | IF(F38="E",-(G38+H38*$AH$29+I38*$AH$30), IF(F38="W",(G38+H38*$AH$29+I38*$AH$30),0)) |
| AG38 | (AE38*AH$27) |
| AH38 | (AF38*AH$27) |
| AE40 | IF(B40="N",(C40+D40*$AH$29+E40*$AH$30), IF(B40="S",-(C40+D40*$AH$29+E40*$AH$30),0)) |
| AF40 | IF(F40="E",(G40+H40*$AH$29+I40*$AH$30), IF(F40="W",(G40+H40*$AH$29+I40*$AH$30),0)) |
| AG40 | (AE40*AH$27) |
| AH40 | (AF40*AH$27) |
| AI40 | (ACOS(SIN(AG$38)*SIN(AG40)+(COS(AG$38)*COS(AG40)* COS(ABS(AH$38-AH40))))*AH$28) |
| AJ40 | ROUND(AI40*AK$28,1) |
| AK40 | ROUND((ACOS((SIN(AG40)-(SIN(AG$38)*COS(AI40/ AH$28)))/(COS(AG$38)*SIN(A140/AH$28)))*AH$28),2) |
| K40 | IF(OR(C40="",D40="",E40="",G40="",H40="",I40="")),"", IF(OR(C$15="",D$15="",E$15="",G$15="",H$15="",I$15=""), "",IF(J40="x","x",IF(AND(B40<>"N",B40<>"S"),"N / S ?", IF(AND(F40<>"E",F40<>"W"),"E / W ?", IF(AND(B$15<>"N",B$15<>"S"),"N / S ?", IF(AND(F$15<>"E",F$15<>"W"),"E / W ?",AJ40))))))) |
| L40 | IF(K40="x","x",IF(AND(C40="",D40="",E40="",G40="", H40="",I40="")),"",IF(J40=1,K$33,IF(J40=2,L$33, IF(J40=3,M$33,IF(J40=4,N$33,"")))))) |
| M40 | IF(K40="x","x",IF(AND(K$29="",L$29="",M$29="", N$29="")),"",IF(L40="","",IF (K40-L40<0, ROUND((K40-L40),1 )&"in",IF(K40-L40>0, ROUND((K40-L40),1)&"out",IF(K40-L40=0,"@ 3db pt", "oops")))))) |
| N40 | IF(K40="x","x",IF(OR(K40=0,K40=""),"",AK40)) |
| O40 | IF(K40="x","x",IF(OR(K40=0,K40=""),"",N40+180)) |
| R40 | IF(AND(Z$32="w",Z$33=0),"#####",AD$28) |
| S40 | IF(K40="x","x",IF(J40="","",CHOOSE(J40,2*AK$27+S$28/ 100*S$29,2*AK$27+T$28/100*T$29,2*AK$27+U$28/ 100*U$29,2*AK$27+V$28/100*V$29))) |
| T40 | IF(K40="x","x",IF(J40="","",CHOOSE(J40,2*AK$27+S$30/ 100*S$31,2*AK$27+T$30/100*T$31,2*AK$27+U$30/ 100*U$31,2*AK$27+V$30/100*V$31))) |
| X40 | IF(K40="x","x",IF(OR(K40=0,K40="",Q40=""),"", AK$29+20*(LOG(K40)+L0G(Q40)))) |
| Y40 | IF(K40="x","x",IF(L40="","",R40+CHOOSE(J40,K$28,L$28, M$28,N$28)+$E$34+P40-S40-T40-CHOOSE(J40,S$34,T$34, U$34,V$34)-U40-V40-Z$10-W40-X40-Z$34)) |
| AB40 | IF(K40="x","x",IF(OR(J40>4,Y40=""),"",IF(K40=0,0, ABS(Y40)-ABS(Z40)))) |

The above disclosure and representative examples are meant to be illustrative of the invention and not to limit the scope or spirit as defined by the appended claims and their equivalents.

What is claimed is:

1. A method for determining the performance of communications systems comprising the steps of:
   a. selecting a series of test points in the communications system;
   b. measuring a unit value for each test point;
   c. calculating a benchmark value for each test point;
   d. selecting a remote test site;
   e. calculating a projected RF value for the communications system at the remote test site using the unit values and the benchmark values;
   f. measuring an actual RF value for the communications system at the remote test site; and
   g. comparing the projected RF value with the actual RF value to determine whether the performance of the communications system is acceptable.

2. The method as characterized in claim 1, wherein the test points are selected from the group consisting of an output end of at least one transmitter, an output end of at least one station jumper, an output end of at least one combiner, an output end of at least one combiner pigtail, an output end of at least one transmission line, at least one fixed antenna, at least one antenna pigtail, a lower 3 db point of an antenna radiation pattern for each of the at least one fixed antenna, at least one remote test antenna, the output end of a test cable for each of the at least one remote test antenna, and a calibrated spectrum analyzer.

3. The method as characterized in claim 2, wherein the unit values are measured at each test point and are selected from the group consisting of an RF output of the at least one RF transmitter, a power output of the at least one station jumper, a power output of the at least one combiner, a forward power at an end of the at least one combiner pigtail, a reflected power at the end of the at least one combiner pigtail, a length of the at least one transmission line, a loss of the at least one transmission line, a gain of the at least one fixed antenna, a loss of the at least one antenna pigtail, a location of the lower 3 db point of the antenna radiation pattern for the at least one fixed antenna, a beam width for each of the at least one fixed antenna, an antenna downtilt for each of the at least one fixed antenna, an RF signal measurement received by the at least one remote test antenna, and a loss of the at least one test cable.

4. The method as characterized in claim 3, wherein the benchmark values comprise:
   a. the unit values;
   b. known values selected from the group consisting of specifications for components of the communications system and any special losses inherent in the communications system; and
   c. additional values calculated from known equations and selected from the group consisting of a true power output of the at least on transmitter, a loss of the at least one station jumper, a loss of the at least one combiner, differences between the unit values and the known values for each component of the communications system, a loss of the at least one combiner pigtail, an adjusted power into the at least one transmission line, a VSWR at the end of the at least one combiner pigtail, a projected VSWR at the end of the at least one transmission line, an ERP, a difference between the calculated ERP and a licensed ERP, a receive system gain, the distance between the at least one fixed antenna and the at least one remote test antenna, the distance between each of the at least one fixed antenna and the respective lower 3 db point of each of the at least one fixed antenna, free space losses, a projected RF level for each of the at least one fixed antenna, and a projected test error.

5. The method as characterized in claim 4, wherein the at least one remote test antenna is located outside of the at least one lower 3 db point of the respective at least one fixed antenna.

6. The method as characterized in claim 1, wherein the benchmark values are automatically compared to the unit values at predetermined periods of time and if the benchmark values differ from the unit values by a predetermined value, an alarm is triggered.

7. The method as characterized in claim 1, wherein the actual RF values are automatically compared to the projected RF values at predetermined periods of time and if the actual RF values differ from the projected RF values by a predetermined value, an alarm is triggered.

8. The method as characterized in claim 6, wherein the actual RF values are automatically compared to the projected RF values at predetermined periods of time and if the actual RF values differ from the projected RF values by a predetermined value, an alarm is triggered.

9. A method for determining the performance of a communications system comprising the steps of:
   a. selecting a communications system comprising components selected from the group consisting of at least one transmitter, at least one station jumper, at least one combiner, at least one combiner pigtail, at least one transmission line, at least one fixed antenna, and at least one antenna pigtail;
   b. selecting a series of test points in the communications system corresponding to an output end of the at least one transmitter, an output end of the at least one station jumper, an output end of the at least one combiner, an output end of the at least one combiner pigtail, an output end of the at least one transmission line, the at least one fixed antenna, the at least one antenna pigtail, and the lower 3 db point of an antenna radiation pattern for each of the at least one fixed antenna;
   c. measuring a unit value for each test point;
   d. calculating a benchmark value for each test point;
   e. selecting a remote test site at a remote test site location, the remote test site comprising components selected from the group consisting of at least one remote test antenna, the output end of a test cable for each of the at least one remote test antenna, and a calibrated spectrum analyzer;
   f. calculating a projected RF value for the remote test site using the unit values and the benchmark values;
   g. measuring an actual RF value for the remote test site; and
   h. comparing the projected RF value with the actual RF value to determine whether the performance of the communications system is acceptable.

10. The method as characterized in claim 9, wherein the unit values are measured at each test point and are selected from the group consisting of an RF output of the at least one RF transmitter, a power output of the at least one station jumper, a power output of the at least one combiner, a forward power at an end of the at least one combiner pigtail, a reflected power at the end of the at least one combiner pigtail, a length of the at least one transmission line, a loss of the at least one transmission line, a gain of the at least one fixed antenna, a loss of the at least one antenna pigtail, a location of the lower 3 db point of the antenna radiation pattern for the at least one fixed antenna, a beam width for each of the at least one fixed antenna, an antenna downtilt for each of the at least one fixed antenna, an RF signal measurement received by the at least one remote test antenna, and a loss of the at least one test cable.

11. The method as characterized in claim 10, wherein the benchmark values comprise:
   a. the unit values;
   b. known values selected from the group consisting of specifications for components of the communications system and any special losses inherent in the communications system; and
   c. additional values calculated from known equations and selected from the group consisting of a true power output of the at least on transmitter, a loss of the at least one station jumper, a loss of the at least one combiner, differences between the unit values and the known values for each component of the communications system, a loss of the at least one combiner pigtail, an adjusted power into the at least one transmission line, a VSWR at the end of the at least one combiner pigtail, a projected VSWR at the end of the at least one transmission line, an ERP, a difference between the calculated ERP and a licensed ERP, a receive system gain, the distance between the at least one fixed antenna and the at least one remote test antenna, the distance between each of the at least one fixed antenna and the respective lower 3 db point of each of the at least one fixed antenna, free space losses, a projected RF level for each of the at least one fixed antenna, and a projected test error.

12. The method as characterized in claim 11, wherein the actual RF values are automatically compared to the projected RF values at predetermined periods of time and if the actual RF values differ from the projected RF values by a predetermined value, an alarm is triggered.

13. The method as characterized in claim 12, wherein the benchmark values are automatically compared to the unit values at predetermined periods of time and if the benchmark values differ from the unit values by a predetermined value, an alarm is triggered.

* * * * *